United States Patent
Kaethner et al.

(10) Patent No.: US 11,017,514 B2
(45) Date of Patent: May 25, 2021

(54) DETERMINING A DIFFERENCE IMAGE DATASET OF AN EXAMINATION VOLUME

(71) Applicant: Siemens Healthcare GmbH, Erlangen (DE)

(72) Inventors: Christian Kaethner, Forchheim (DE); Markus Kowarschik, Nuremberg (DE); Annette Birkhold, Nuremberg (DE); Christopher Rohkohl, Escaldes-Engordany (AD); Michael Manhart, Fuerth (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 50 days.

(21) Appl. No.: 16/460,078

(22) Filed: Jul. 2, 2019

(65) Prior Publication Data
US 2020/0013153 A1    Jan. 9, 2020

(30) Foreign Application Priority Data

Jul. 6, 2018    (EP) .................................... 18182251
Mar. 18, 2019   (EP) .................................... 19163508

(51) Int. Cl.
*G06K 9/00* (2006.01)
*G06T 5/50* (2006.01)
(Continued)

(52) U.S. Cl.
CPC .................. *G06T 5/50* (2013.01); *G06N 3/04* (2013.01); *G06N 3/08* (2013.01); *G06T 7/0012* (2013.01);
(Continued)

(58) Field of Classification Search
CPC ....... G06T 5/50; G06T 7/0012; G06T 11/003; G06T 2207/20084; G06T 2207/10116;
(Continued)

(56) References Cited

U.S. PATENT DOCUMENTS 6,292,527 B1 *   9/2001   Guendel ................ A61B 6/032
                                                   378/15
6,435,714 B1 *   8/2002   Bruder .................. A61B 6/032
                                                   378/196
(Continued)

FOREIGN PATENT DOCUMENTS

DE    102014213408 A1    1/2016
DE    102019200269 A1    7/2020
(Continued)

OTHER PUBLICATIONS

Montoya Juan C et al: "Deep learning angiography (DLA): three-dimensional C-arm cone beam CT angiography generated from deep learning method using a convolutional neural network",; Progress in Biomedical Optics and Imaging; SPIE—International Society for Optical Engineering, Bellingham, WA, US; Bd. 10573, Mar. 9, 2018 (Mar. 9, 2018), pp. 105731NI-105731N9, XP060104906; ISSN: 1605-7422, DOI: 10.1117/12.2293985; ISBN: 978-1-5106-0027-0; 2018.
(Continued)

*Primary Examiner* — Amir Alavi
(74) *Attorney, Agent, or Firm* — Harness, Dickey & Pierce, P.L.C.

(57) ABSTRACT

A solution for determination of a three-dimensional difference image dataset of an examination volume. Here two-dimensional real image datasets relating to the examination volume are received via an interface, each of the two-dimensional real image datasets including a two-dimensional x-ray projection of the examination volume in relation to a projection direction. Furthermore, the first difference image dataset is determined based on the two-dimensional real image datasets and based on a first trained function via a processing unit. Here the first difference image dataset is at least two-dimensional, in particular at least three-dimensional, in particular the first difference image dataset is
(Continued)

three-dimensional or four-dimensional. The determination of the first difference image dataset based on the two-dimensional real image datasets and based on a trained function enables mask recordings of the examination volume to be dispensed with, and thus the x-ray load of the examination volume to be reduced.

28 Claims, 11 Drawing Sheets

(51) Int. Cl.
*G06T 11/00* (2006.01)
*G06T 7/00* (2017.01)
*G06N 3/08* (2006.01)
*G06N 3/04* (2006.01)

(52) U.S. Cl.
CPC ... *G06T 11/003* (2013.01); *G06T 2207/10116* (2013.01); *G06T 2207/20076* (2013.01); *G06T 2207/20081* (2013.01); *G06T 2207/20084* (2013.01); *G06T 2207/20224* (2013.01); *G06T 2207/30101* (2013.01); *G06T 2211/404* (2013.01)

(58) Field of Classification Search
CPC . G06T 2207/20081; G06T 2207/20076; G06T 2207/30101; G06T 2207/20224; G06T 2211/404; G06N 3/08; G06N 3/04
See application file for complete search history.

(56) References Cited

U.S. PATENT DOCUMENTS

| | | | | |
|---|---|---|---|---|
| 7,020,319 | B2* | 3/2006 | Mertelmeier | A61B 6/032 378/163 |
| 7,209,547 | B2* | 4/2007 | Baier | A61B 6/032 378/149 |
| 8,094,904 | B2* | 1/2012 | Slabaugh | G06T 5/20 382/130 |
| 10,140,421 | B1* | 11/2018 | Bernard | G16H 50/70 |
| 10,152,571 | B1* | 12/2018 | Lyman | A61B 6/50 |
| 10,340,044 | B2* | 7/2019 | Yao | G06N 3/0454 |
| 10,360,999 | B2* | 7/2019 | Bernard | G06F 19/321 |
| 2004/0258210 | A1* | 12/2004 | Ritter | A61B 5/107 378/198 |
| 2009/0087070 | A1* | 4/2009 | Slabaugh | G06T 5/20 382/132 |
| 2016/0012636 | A1 | 1/2016 | Lauritsch et al. | |
| 2016/0267704 | A1 | 9/2016 | Mistretta et al. | |
| 2017/0277977 | A1 | 9/2017 | Kitamura | |
| 2018/0014466 | A1 | 1/2018 | Underhill | |
| 2018/0061059 | A1 | 3/2018 | Xu et al. | |
| 2018/0182132 | A1 | 6/2018 | Kowarschik et al. | |
| 2020/0013153 | A1* | 1/2020 | Kaethner | G06T 7/254 |
| 2020/0226801 | A1 | 7/2020 | Tavoc et al. | |
| 2020/0226802 | A1 | 7/2020 | Kaethner et al. | |
| 2020/0394790 | A1 | 12/2020 | Kaethner et al. | |

FOREIGN PATENT DOCUMENTS

| | | |
|---|---|---|
| DE | 102019200270 A1 | 7/2020 |
| DE | 102019208496 A1 | 12/2020 |
| EP | 3340178 A1 | 6/2018 |
| JP | 2006110372 A | 4/2006 |
| JP | 2011240178 A | 12/2011 |
| JP | 2017174039 A | 9/2017 |
| JP | 2018089301 A | 6/2018 |
| WO | WO 2018120644 A1 | 7/2018 |

OTHER PUBLICATIONS

European Search Report for European Patent Application No. EP18182251 dated Nov. 16, 2018.
Extended European Search Repot dated Nov. 6, 2019.
European Office Action dated Nov. 24, 2020.
Japanese Office Action and English translation thereof dated Nov. 24, 2020.

* cited by examiner

DETERMINING A DIFFERENCE IMAGE DATASET OF AN EXAMINATION VOLUME

PRIORITY STATEMENT

The present application hereby claims priority under 35 U.S.C. § 119 to European patent application numbers EP 18182251.1 filed Jul. 6, 2018 and EP 19163508.5 filed Mar. 18, 2019, the entire contents of each of which are hereby incorporated herein by reference.

FIELD

At least one embodiment of the invention generally relates to a method of determining a difference image dataset of an examination volume.

BACKGROUND

In Digital Subtraction Angiography (abbreviated to DSA) one or more vessels in an examination volume are shown by x-ray images wherein, to suppress further structures in the examination volume, recordings of the vessel without contrast medium (known as mask recordings) are combined with recordings of the vessel including a contrast medium that is located in the vessel. The contrast medium is introduced into the vessel during the examination here in order to determine parameters, in particular hydrodynamic parameters, of a fluid, wherein the fluid is flowing in the vessel.

In four-dimensional DSA a time-resolved series of three-dimensional DSA image data is provided via an image reconstruction method. Here normalized two-dimensional x-ray projections of an examination volume are back-projected together with time information into a volume element. The two-dimensional x-ray projections usually originate here from a rotating recording protocol of a C-arm x-ray machine.

The fact that, for digital subtraction angiography, both recordings of the vessel without contrast medium and also recordings of the vessel including a contrast medium are made, means that examination volume is subjected to a high x-ray load. The recordings of the vessel without contrast medium are also referred to as mask recordings.

An image dataset can be referred to below as a real image dataset when it maps the actual distribution of values and/or intensities (e.g. Hounsfield units, coefficients of x-ray attenuation) in an examination volume. An image dataset can be referred to as a difference image dataset when it maps a difference between an actual distribution of values and/or intensities in an examination volume. A difference image dataset is not necessarily determined by subtraction of two real image datasets however. An image dataset can be referred to as a subtraction image dataset when it has been determined by subtraction of two image datasets, in particular by subtraction of two real image datasets. Therefore in particular each subtraction image dataset could be interpreted as a difference image dataset, but not every difference image dataset can be interpreted as a subtraction image dataset.

SUMMARY

At least one embodiment of the present invention provides a solution for providing a difference image dataset without a mask recording, and thereby to reduce the radiation load on the examination volume.

At least one embodiment of the present invention is directed to a method for determining a first difference image dataset, by a determination system, by an x-ray unit, by a method for adjusting a trained function, by a training system, by a computer program product and by a computer-readable storage medium. The embodiments of the methods can in particular involve computer-implemented methods. Advantageous developments are specified in the claims.

Embodiments will be described below both with regard to the claimed facilities and also with regard to the claimed method. Features, advantages or alternate forms of embodiment mentioned here are likewise also to be transferred to the other claimed subject matter and vice versa. In other words the physical claims (which are directed to a facility for example) can also be developed with the features that are described or claimed in conjunction with a method. The corresponding functional features of the method in such cases are embodied by corresponding physical modules.

Embodiments will further be described both with regard to methods and facilities for determining difference image datasets and also with regard to methods and facilities for adjusting trained functions. Features and alternate forms of embodiment of data structures and/or functions for methods and facilities for determination can be transferred here to analogous data structures and/or functions for methods and facilities for adjustment. Analogous data structures can in particular be identified here by using the prefix "training". Furthermore, the trained functions used in methods and facilities for determination of difference image datasets can in particular have been adjusted and/or provided by methods and facilities for adjustment of trained functions.

In particular, the determination of the first difference image dataset is thus based on the first trained function, in that the determination of the first difference image dataset comprises an application of the first trained function to the three-dimensional real image dataset. In particular this embodiment of the invention thus relates to a method for determining a first difference image dataset of an examination volume, wherein the first difference image dataset is three-dimensional, the method comprising:

receiving two-dimensional real image datasets relating to an examination volume via an interface, wherein each of the two-dimensional real image datasets comprises a two-dimensional x-ray projection of the examination volume in relation to a projection direction;

reconstructing, via the processing unit, of a three-dimensional real image dataset based on the two-dimensional real image datasets; and determining, via a processing unit, of the first difference image dataset based on the two-dimensional real image datasets, wherein the determination comprises an application of the first trained function to the three-dimensional real image dataset.

In particular the determination of the first difference image dataset is thus based on the two-dimensional real image datasets and the first trained function, in that the determination of the first difference image dataset comprises a reconstruction of the three-dimensional first difference image dataset based on the two-dimensional difference image datasets, and the two-dimensional difference image datasets based for their part on the two-dimensional real image datasets and the first trained function. In particular this embodiment of the invention thus relates to a method for determining a first difference image dataset of an examination volume, wherein the first difference image dataset is three-dimensional, comprising:

receiving two-dimensional real image datasets relating to an examination volume via an interface, wherein each of the two-dimensional real image datasets comprises a two-dimensional x-ray projection of the examination volume in relation to a projection direction;

determining two-dimensional difference image datasets by application of the first trained function to the two-dimensional real image datasets via the processing unit; and determining the first difference image dataset via a processing unit, wherein the determination of the first difference image dataset comprises a reconstruction based on the two-dimensional difference image datasets.

An embodiment of the invention can further relate to a method for adjusting a second trained function, wherein the method comprises:

receiving the second trained function via an interface;

receiving a three-dimensional training difference image dataset of an examination volume and of two-dimensional training image datasets of the examination volume via the interface, wherein the two-dimensional training image datasets correspond to two-dimensional real image datasets or two-dimensional difference image datasets;

determining, via the processing unit, a first four-dimensional training difference image dataset by back-projection based on the three-dimensional training difference image dataset and the two-dimensional training image datasets;

determining, via the processing unit, a second four-dimensional training difference image dataset by application of the second trained function to the three-dimensional training difference image dataset and the two-dimensional training image datasets; and adjusting, via the processing unit, the second trained function based on a comparison of the first four-dimensional training difference image dataset and of the second four-dimensional training difference image dataset;

with an optional provision of the second trained function via the interface.

An embodiment of the invention further relates to a determination system for determination of a difference image dataset of an examination volume, comprising:

an interface, embodied for receiving two-dimensional real image datasets relating to an examination volume, wherein each of the two-dimensional real image datasets comprises a two-dimensional x-ray projection of the examination volume in relation to a projection direction; and a processing unit including at least one processor and/or processing circuitry, embodied for determination of the difference image dataset based on the two-dimensional real image datasets and based on a trained function, wherein the first difference image dataset is at least two-dimensional, in particular at least three-dimensional.

An embodiment of the invention can further relate to a determination system for determination of a two-dimensional difference image dataset of an examination volume, comprising:

an interface, embodied for receiving a two-dimensional real image dataset relating to the examination volume, wherein the two-dimensional real image dataset comprises a two-dimensional x-ray projection of the examination volume in relation to a projection; and a processing unit including at least one processor and/or processing circuitry, embodied for determination of the two-dimensional difference image dataset by application of a first trained function to the two-dimensional real image dataset.

An embodiment of the invention further relates to a training system for adjustment of a first trained function, comprising:

an interface, embodied for receiving the first trained function, and further embodied for receiving first two-dimensional training image datasets and second two-dimensional training image datasets of an examination volume, wherein each of the first two-dimensional training image datasets comprises a two-dimensional x-ray projection of the examination volume in relation to a projection direction, wherein the examination volume does not include any x-ray contrast medium during the recording of a first two-dimensional x-ray projection, wherein each of the second two-dimensional training image datasets comprises a second two-dimensional x-ray projection of the examination volume in relation to a projection direction, and wherein the examination volume includes x-ray contrast medium during the recording of a second x-ray projection; and a processing unit including at least one processor and/or processing circuitry, embodied for determination of a first training difference image dataset by digital subtraction angiography based on the first and the second two-dimensional training image datasets, further embodied for determination of a second training difference image dataset based on the second two-dimensional training image datasets and based on the first trained function, and further embodied for adjusting the first trained function based on a comparison of the first training difference image dataset and of the second training difference image dataset.

An embodiment of the invention can furthermore relate to a training system for adjusting a second trained function, comprising:

an interface, embodied for receiving the second trained function, further embodied for receiving a three-dimensional training difference image dataset of an examination volume and two-dimensional training image datasets of the examination volume, wherein the two-dimensional training image datasets correspond to two-dimensional real image datasets or two-dimensional difference image datasets, and optionally further embodied for providing the second trained function; and a processing unit, including at least one processor and/or processing circuitry, embodied for determination of a first four-dimensional training difference image dataset by back-projection based on the three-dimensional training difference image dataset and the two-dimensional training image datasets, further embodied for determination of a second four-dimensional training difference image dataset by application of the second trained function to the three-dimensional training difference image dataset and the two-dimensional training image datasets, and further embodied for adjusting the second trained function based on a comparison of the first four-dimensional training difference image dataset and of the second four-dimensional training difference image dataset.

An embodiment of the invention also relates to a method for adjusting a first trained function, comprising:

receiving the first trained function via an interface;

receiving, via the interface, first two-dimensional training image datasets of an examination volume and second two-dimensional training image datasets of the examination volume, each of the first two-dimensional training image datasets including a two-dimensional x-ray projection of the examination volume in relation to a projection direction wherein the examination volume does not include any x-ray contrast media during recording of a first two-dimensional x-ray projection, and each of the second two-dimensional training image datasets including a second two-dimensional x-ray projection of the examination volume in relation to a projection direction wherein the examination volume includes x-ray contrast media during the recording of a second x-ray projection for the second two-dimensional x-ray projection of the examination volume in relation to a projection direction;

determining, via a processor, a first training difference image dataset by digital subtraction angiography based on the first two-dimensional training image dataset and the second two-dimensional training image datasets;

determining, via the processor, a second training difference image dataset based on the second two-dimensional training image datasets and based on the first trained function; and adjusting the first trained function based on a comparison of the first training difference image dataset determined and the second training difference image dataset determined, via the processor.

An embodiment of the invention also relates to a determination system for determination of a first difference image dataset of an examination volume, the determination system comprising:

an interface, embodied to receive two-dimensional real image datasets relating to the examination volume, each of the two-dimensional real image datasets including a two-dimensional x-ray projection of the examination volume in relation to a projection direction; and a processor, embodied to determine the first difference image dataset based on the two-dimensional real image datasets received and based on a first trained function, the first difference image dataset being at least two-dimensional, in particular at least three-dimensional.

An embodiment of the invention also relates to an x-ray unit comprising the determination system of an embodiment.

An embodiment of the invention also relates to a training system for adjusting a first trained function, comprising:

an interface, embodied to receive the trained function and further embodied to receive first two-dimensional training image datasets and second two-dimensional training image datasets of an examination volume, each of the first two-dimensional training image datasets including a two-dimensional x-ray projection of the examination volume in relation to a projection direction wherein the examination volume does not include any x-ray contrast media during recording of a first two-dimensional x-ray projection, and each of the second two-dimensional training image datasets including a second two-dimensional x-ray projection of the examination volume in relation to a projection direction wherein the examination volume includes x-ray contrast media during recording of a second x-ray projection;

a processor, embodied
  to determine a first training difference image dataset by digital subtraction angiography based on the first and the second two-dimensional training image datasets,
  to determine a second training difference image dataset based on the second two-dimensional training image datasets and based on the first trained function, and
  to adjust the first trained function based on a comparison of the first training difference image dataset determined and the second training difference image dataset determined.

An embodiment of the invention also relates to a non-transitory computer program product storing a computer program, directly loadable into a memory of at least one of a determination system and a training system, the computer program including program sections to carry out the method of an embodiment when the program sections are carried out by the at least one of the determination system and the training system.

An embodiment of the invention also relates to a non-transitory computer-readable storage medium, storing program sections, readable and executable by at least one of a determination system and a training system, to carrying out the method of an embodiment when the program sections are carried out by the at least one of the determination system and the training system.

An embodiment of the invention also relates to non-transitory computer program products with computer programs as well as non-transitory computer-readable media.

In particular, an embodiment of the invention relates to a non-transitory computer program product with a computer program, which is able to be loaded directly into a memory of a determination system and/or a training system, with program sections for carrying out all steps of the method for determination of a first difference image dataset of an embodiment and/or for carrying out all steps of the method for determination of a two-dimensional difference image dataset of an embodiment and/or for carrying out all steps of the method for training a first trained function of an embodiment, when the program sections are executed by the determination system and/or the training system.

In particular, an embodiment of the invention can also relate to a non-transitory computer program product with a computer program, which is able to be loaded directly into a memory of a determination system, with program sections for carrying out all steps of the method for determination of a first difference image dataset of an embodiment, when the program sections are executed by the determination system.

In particular, an embodiment of the invention can also relate to a non-transitory computer program product with a computer program, which is able to be loaded directly into a memory of a determination system, with program sections for carrying out all steps of the method for determination of a two-dimensional difference image dataset of an embodiment, when the program sections are executed by the determination system.

In particular, an embodiment of the invention can also relate to a non-transitory computer program product with a computer program, which is able to be loaded directly into a memory of a training system, with program sections for carrying out all steps of the method for training a first trained function of an embodiment, when the program sections are executed by the training system.

In particular, an embodiment of the invention can also relate to a non-transitory computer program product with a computer program, which is able to be loaded directly into a memory of a training system, with program sections for carrying out all steps of an embodiment of the method for training a second trained function, when the program sections are executed by the training system.

In particular, an embodiment of the invention can also relate to a non-transitory computer-readable storage medium, on which program sections able to be read and carried out by a determination system and/or a training system are stored, for carrying out all steps of the method for determination of a first difference image dataset of an embodiment and/or for carrying out all steps of the method for determination of a two-dimensional difference image dataset of an embodiment and/or for carrying out all steps of the method for training a first trained function of an embodiment, when the program sections are executed by the determination system and/or the training system.

In particular, an embodiment of the invention can also relate to a non-transitory computer-readable storage medium, on which program sections able to be read and carried out by a determination system are stored, for carrying out all steps of the method for determination of a first difference image dataset of an embodiment, when the program sections are executed by the determination system.

In particular, an embodiment of the invention can also relate to a non-transitory computer-readable storage medium, on which program sections able to be read and carried out by a determination system are stored, for carrying out all steps of the method for determination of a two-dimensional difference image dataset of an embodiment, when the program sections are executed by the determination system.

In particular, an embodiment of the invention can also relate to a non-transitory computer-readable storage medium, on which program sections able to be read and carried out by a training system are stored, for carrying out all steps of the method for training a first trained function of an embodiment, when the program sections are executed by the training system.

In particular, an embodiment of the invention can also relate to a non-transitory computer-readable storage medium, on which program sections able to be read and carried out by a training system are stored, for carrying out all steps of the method of an embodiment for training a second trained function, when the program sections are executed by the training system.

BRIEF DESCRIPTION OF THE DRAWINGS

The characteristics, features and advantages described above, as well as the manner in which these are achieved, will become clearer and easier to understand in conjunction with the description of the example embodiments given below, which are explained in greater detail in conjunction with the drawings. This description does not restrict the invention to these example embodiments. The same components in different figures are provided with identical reference numbers. The figures are not true-to-scale as a rule. In the figures.

DETAILED DESCRIPTION OF THE EXAMPLE EMBODIMENTS

Figure 1:
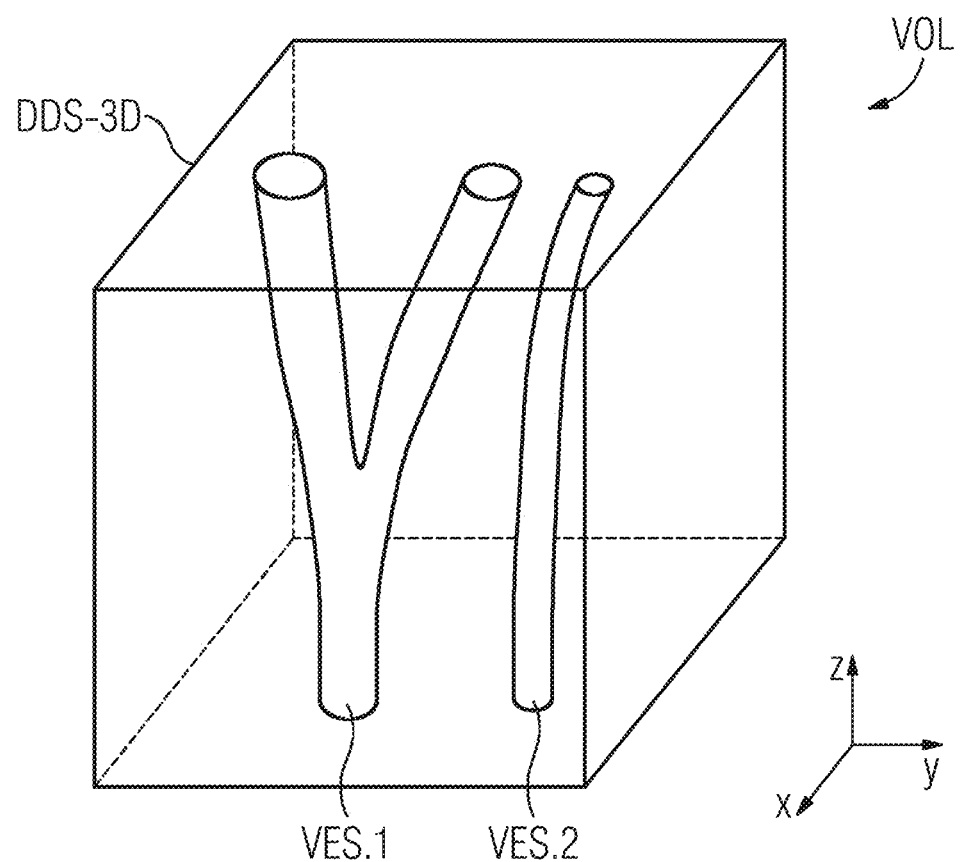
FIG. 1 shows an examination volume with vessels and a three-dimensional difference image dataset.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or porcessors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention is based on two-dimensional real image datasets relating to the examination volume being received via an interface, wherein each of the two-dimensional real image datasets comprises a two-dimensional x-ray projection of the examination volume in relation to a projection direction. Furthermore, the first difference image dataset is determined based on the two-dimensional real image datasets and based on a first trained function by way of a processing unit (including at least one processor and/or processing circuitry). Here the first difference image dataset is at least two-dimensional, in particular the first difference image dataset is at least three-dimensional, in particular the first difference image dataset is three-dimensional or four-dimensional.

The examination volume here can comprise at least one vessel, wherein the vessel can contain a contrast medium, and wherein the spatial density or the spatial distribution of the contrast medium can differ for different two-dimensional x-ray projections. A two-dimensional x-ray projection relating to the examination volume can in particular be a two-dimensional x-ray projection of the examination volume. In particular the two-dimensional x-ray projections can be assigned a recording time, this recording time corresponds to the point in time of the recording of the two-dimensional x-ray projection. A two-dimensional x-ray projection is in particular spatially two-dimensional.

The two-dimensional real image datasets can in particular comprise a first two-dimensional real image dataset and a second two-dimensional real image dataset, wherein the first two-dimensional real image dataset comprises a first x-ray projection of the examination volume in relation to a first projection direction, wherein the second two-dimensional real image dataset comprises a second x-ray projection of the examination volume in relation to a second projection direction, wherein the second projection direction differs from the first projection direction. Thus in particular the two-dimensional real image datasets can comprise a first x-ray projection in relation to a first projection direction and a second x-ray projection in relation to a second projection direction, wherein the first projection direction differs from the second projection direction. The two-dimensional real image datasets can in particular comprise x-ray projections in relation to paired different projection directions. In particular all projection directions of the x-ray projections of the two-dimensional real image datasets can span a common plane. In particular each of the two two-dimensional real image datasets maps the actual distribution of values and/or intensities (e.g. Hounsfield units, coefficients of x-ray attenuation) in the examination volume.

A trained function maps input data to output data. The output data here can in particular furthermore depend on one or more parameters of the trained function. The one or more parameters of the trained function can be determined and/or be adjusted by training. The determination and/or the adjustment of the one or more parameters of the trained function can be based in particular on a pair made up of training input data and associated training output data, wherein the trained function for creating training mapping data is applied to the training input data. In particular the determination and/or the adjustment can be based on a comparison of the training mapping data and the training output data. In general a trainable function, i.e. a function with one or more parameters not yet adjusted, will also be referred to as a trained function.

Other terms for trained function are trained mapping specification, mapping specification with trained parameters, function with trained parameters, algorithm based on artificial intelligence, algorithm of machine learning. An example for a trained function is an artificial neural network, wherein the edge weights of the artificial neural network correspond to the parameters of the trained function. Instead of the term "neural network" the term "neuronal net" can also be used. In particular a trained function can also be a deep neural network or deep artificial neural network. A further example for a trained function is a Support Vector Machine, furthermore other algorithms of machine learning are also able to be employed in particular as the trained function.

In particular the first difference image dataset will be determined by way of a processing unit based on the two-dimensional real image datasets and based on a first trained function, if the first trained function is applied to input data and output data is created here, wherein the input data is based on the two-dimensional real image datasets, and wherein the first difference image dataset is based on the output datasets. In particular the input data can be identical to the two-dimensional real image datasets. In particular the output data can be identical to the first difference image dataset here.

A two-dimensional x-ray projection is in particular spatially two-dimensional. A first difference image dataset, which is three-dimensional, can in particular also be referred to as a "three-dimensional first difference image dataset". A first difference image dataset, which is four-dimensional, can in particular also be referred to as a "four-dimensional first difference image dataset". A three-dimensional first difference image dataset is in particular spatially three-dimensional. A four-dimensional first difference image dataset and/or a four-dimensional second difference image dataset is in particular extended in relation to three spatial directions (another word is "space dimension", "spatial dimension" or "spatial base vector") and in relation to a time direction (another word is "time dimension", "temporal dimension" or "temporal base vector").

In particular the first difference image dataset maps a difference between an actual distribution of values and/or intensities in the examination volume. The second difference image dataset is however in particular not determined by subtraction of two real image datasets. In particular other structures in the examination region outside of the vessel can be suppressed or not shown in the first difference image dataset. In particular the edges of the vessel can also not be contained and/or suppressed in the first difference image dataset. In particular the first difference image dataset can just show the contrast medium or the contrast medium concentration, since (except for artifacts) only the contrast medium concentration is variable in the examination volume.

The inventors have recognized that mask recordings and thereby an additional x-ray load on the examination volume can be dispensed with if the first difference image dataset is determined based on the two-dimensional real image datasets and based on a trained function. Thus in particular a patient who includes the examination volume is subjected to less of an x-ray load. Another word for "x-ray load" is "radiation dose".

According to a further embodiment of the invention the first difference image dataset is three-dimensional, furthermore the method comprises the reconstruction via the processing unit of a three-dimensional real image dataset based on the two-dimensional real image dataset. Furthermore the determination of the three-dimensional first difference image dataset comprises an application via the processing unit of the first trained function to the three-dimensional real image dataset.

In particular, the determination of the first difference image dataset is thus based on the first trained function, in that the determination of the first difference image dataset comprises an application of the first trained function to the three-dimensional real image dataset. In particular this embodiment of the invention thus relates to a method for determining a first difference image dataset of an examination volume, wherein the first difference image dataset is three-dimensional, the method comprising:

receiving two-dimensional real image datasets relating to an examination volume via an interface, wherein each of the two-dimensional real image datasets comprises a two-dimensional x-ray projection of the examination volume in relation to a projection direction;

reconstructing, via the processing unit, of a three-dimensional real image dataset based on the two-dimensional real image datasets; and determining, via a processing unit, of the first difference image dataset based on the two-dimensional real image datasets, wherein the determination comprises an application of the first trained function to the three-dimensional real image dataset.

The three-dimensional real image dataset in particular maps an actual distribution of values and/or intensities (e.g. Hounsfield units, coefficients of x-ray attenuation) in the examination volume. The actual distribution of values and/or intensities here is in particular an actual three-dimensional distribution.

The first trained function can be applied in particular to the three-dimensional real image dataset, in that the input data of the first trained function comprises the three-dimensional real image dataset or is identical to the three-dimensional real image dataset. The first trained function can in particular be a function that maps three-dimensional image datasets to three-dimensional image datasets.

The inventors have recognized that the three-dimensional real image dataset is an especially suitable input value for the trained function, since it comprises, in a geometrically ordered way and without unnecessary redundancies, all information about the examination volume contained in the x-ray projections of the two-dimensional real image datasets. Therefore the first difference image dataset can be determined especially efficiently.

According to a further embodiment of the invention, the method further comprises the determination of a three-dimensional probability dataset by application of the first trained function to the three-dimensional real image dataset via the processing unit, and the determination of the three-dimensional first difference image dataset comprises a pixel-by-pixel multiplication via the processing unit of the three-dimensional probability image dataset with the three-dimensional real image dataset.

The three-dimensional probability dataset here in particular allocates a probability value to one or more voxels of the three-dimensional real image dataset. In particular the three-dimensional probability value can allocate a probability value to all voxels of the three-dimensional real image dataset, in this case the three-dimensional probability dataset can be interpreted as a three-dimensional probability image dataset. A probability value is in particular a number greater than or equal to 0 and less than or equal to 1. The probability value assigned to a voxel can in particular relate to the probability of the voxel being contained in the image of the vessel located in the examination volume. As an alternative the probability value assigned to a voxel can in particular relate to the probability of the voxel not being contained in the image of the vessel located in the examination volume.

A probability value can in particular also be binary, i.e. either have the value 0 or the value 1. In this case the probability image dataset can also be interpreted as the segmentation of the vessel in the three-dimensional real image dataset.

The determination of the three-dimensional first difference image dataset can in particular comprise a multiplication of the three-dimensional probability dataset with the three-dimensional real image dataset, if the three-dimensional first difference image dataset is the result of the multiplication of the three-dimensional probability dataset with the three-dimensional real image dataset and or is based on the result of the multiplication of the three-dimensional probability dataset with the three-dimensional real image dataset. The multiplication of the three-dimensional probability dataset with the three-dimensional real image dataset can in particular be a pixel-by-pixel multiplication.

The inventors have recognized that by way of the application of the first trained function to the three-dimensional real image dataset probability values for the dataset that correspond to specific voxels in the vessel contained in the examination volume can be determined in an especially simple manner. What is involved here in the wider sense is image processing, wherein trained functions can achieve good results in a known way. Through the multiplication of the three-dimensional probability dataset with the three-dimensional real image dataset a three-dimensional first difference image dataset can then be created in an efficient manner, since the intensity values of image regions with low probability values are filtered out by the multiplication, and these image regions precisely correspond to the regions of the examination volume that correspond to vessels not contained in the examination volume.

According to a further embodiment of the invention, the method further comprises the receipt of a transfer function via the interface and also the modification of the three-dimensional probability dataset via the processing unit based on the transfer function.

A transfer function is in particular a function that maps probability values to probability values. In particular a transfer function is therefore a function that maps the interval [0; 1] to the interval [0; 1]. In particular the transfer function T can be a monotonously increasing function, i.e. $T(x) \leq T(y)$ for $x < y$, in particular the transfer function T can also be a strictly monotonously increasing function, i.e. $T(x) < T(y)$ for $x < y$. The transfer function is advantageously a constant and/or differentiatable function. Advantageously the relationships $T(0)=0$ and $T(1)=1$ apply to the transfer function T.

The transfer function can in particular be defined by a user via an input interface. As an alternative the transfer function can also be selected from a plurality of available transfer functions, for example based on the type of the three-dimensional real image dataset, based on recording parameters for the two-dimensional real image datasets, based on the position of the examination volume in the body of the patient and/or based on the vessel contained in the examination volume.

The modification of the three-dimensional probability dataset can in particular comprise an application of the transfer function to each probability value of the three-dimensional probability dataset. In particular a modified probability value is determined for each probability value of the three-dimensional probability dataset, in that the transfer function is applied to the probability value, and in particular the modified three-dimensional probability dataset includes the modified probability values.

The inventors have recognized that, by the application of a suitable transfer function, image structures or the intensity of image structures that correspond to the background can be amplified or attenuated. If $T(x)=x\gamma$ is used as the transfer function for example, then for $0<\gamma<1$ image structures that correspond to the background are amplified, and for $\gamma>1$ image structures that correspond to the background are attenuated.

According to a further embodiment of the invention the method further contains a determination of two-dimensional vessel image datasets and/or of two-dimensional background image datasets based on the three-dimensional first difference image dataset and/or the three-dimensional real image dataset, and also a determination of two-dimensional modification datasets based on the two-dimensional vessel image datasets and/or the two-dimensional background image datasets, carried out in each case in particular via the processing unit. The determination of the two-dimensional modification datasets can in particular also be based on the two-dimensional real image datasets.

Here the two-dimensional vessel image datasets in particular map vessels in the examination volume without background, and therefore correspond in particular to two-dimensional difference image datasets of the examination volume. Furthermore the two-dimensional background datasets map the examination volume without vessels here.

The inventors have recognized that the use of the two-dimensional modification image datasets in a further computation leads to fewer image artifacts. This is the case since the two-dimensional vessel image datasets and/or the two-dimensional background datasets are determined based on a three-dimensional image dataset, and therefore overlays in relation to specific projection directions can be avoided or resolved.

According to a further possible embodiment of the invention, the method further contains a determination of two-dimensional vessel image datasets and/or of two-dimensional background image datasets based on the three-dimensional first difference image dataset and/or the three-dimensional real image dataset, and also a determination of a three-dimensional or four-dimensional second difference image dataset by application of a trained function to input data, wherein the input data comprises the two-dimensional vessel image datasets and/or the two-dimensional background image datasets. The input data can optionally further comprise the two-dimensional real image datasets.

The inventors have recognized that the use of two-dimensional vessel image datasets and/or two-dimensional background image datasets in the computation of the three-dimensional or four-dimensional second difference image dataset leads to fewer image artifacts. This is the case since the two-dimensional vessel image datasets and/or the two-dimensional background datasets are determined based on a three-dimensional image dataset, and therefore overlays in relation to specific projection directions can be avoided or resolved.

According to a further embodiment of the invention, the two-dimensional vessel image datasets are determined by forward projection of the three-dimensional first difference image dataset, and/or the two-dimensional background image datasets are determined by forward projection of a difference between the three-dimensional real image dataset and the three-dimensional first difference image dataset. A forward projection here in particular comprises the application of a projection operator to a three-dimensional image dataset. An alternate term for "forward projection" is "projection".

In particular a two-dimensional vessel image dataset and/or a two-dimensional background image dataset is determined for each of the two-dimensional real image datasets, wherein the forward projection is done in relation to the projection direction of the two-dimensional real image dataset. In particular a two-dimensional modification image dataset is determined for each of the two-dimensional real image datasets, wherein the two-dimensional modification image dataset is based on the two-dimensional real image dataset and also on the two-dimensional vessel image dataset and/or the two-dimensional background image dataset.

The inventors have recognized that a forward projection can reflect the projection geometry especially well and efficiently. The fact that the two-dimensional vessel image datasets are based on a forward projection of the three-dimensional first difference image dataset enables it to be guaranteed in particular that the two-dimensional vessel image datasets only map vessels and as little background as possible. The fact that the two-dimensional background image datasets are based on a forward projection of a difference between the three-dimensional real image dataset and the three-dimensional first difference image dataset enables it to be guaranteed in particular that the two-dimensional background datasets only map background and as few vessels as possible.

According to a further embodiment of the invention, the method further contains a determination of a four-dimensional second difference image dataset based on the two-dimensional modification image datasets and also the three-dimensional first difference image dataset. The determination is done here in particular via the processing unit.

In particular the determination of the four-dimensional second difference image dataset can be done here by back-projection of the two-dimensional modification image datasets onto the three-dimensional first difference image dataset. The three-dimensional difference image datasets arising from this correspond to different points in time and produce the four-dimensional second difference image dataset arranged temporally. In particular the determination of the four-dimensional second difference image dataset can also comprise the application of a trained function in the various advantageous embodiments that were described previously or will be described below.

The inventors have recognized that a four-dimensional second difference image dataset with especially high quality, in particular especially few artifacts, can be determined based on the two-dimensional modification image datasets.

According to a further embodiment of the invention, the first difference image dataset is three-dimensional, furthermore the method comprises the determination of two-dimensional difference image datasets by application of the first trained function to the two-dimensional real image datasets via the processing unit, wherein the determination of the three-dimensional first difference image dataset comprises a reconstruction based on the two-dimensional difference image datasets.

In particular the determination of the first difference image dataset is thus based on the two-dimensional real image datasets and the first trained function, in that the determination of the first difference image dataset comprises a reconstruction of the three-dimensional first difference image dataset based on the two-dimensional difference image datasets, and the two-dimensional difference image datasets based for their part on the two-dimensional real image datasets and the first trained function. In particular this embodiment of the invention thus relates to a method for determining a first difference image dataset of an examination volume, wherein the first difference image dataset is three-dimensional, comprising:

receiving two-dimensional real image datasets relating to an examination volume via an interface, wherein each of the two-dimensional real image datasets comprises a two-dimensional x-ray projection of the examination volume in relation to a projection direction;

determining two-dimensional difference image datasets by application of the first trained function to the two-dimensional real image datasets via the processing unit; and determining the first difference image dataset via a processing unit, wherein the determination of the first difference image dataset comprises a reconstruction based on the two-dimensional difference image datasets.

In particular two-dimensional difference image datasets are determined by application of the second trained function to the two-dimensional real image datasets, if the first trained function is applied to precisely one of the two two-dimensional real image datasets for the determination of each of the two-dimensional difference image datasets. In particular the first trained function is applied to a two-dimensional real image dataset if the input data of the first trained function is identical to the two-dimensional real image datasets. In particular the output data of such an application can then be identical to one of the two-dimensional subtraction datasets. In particular the first trained function is a function that maps two-dimensional image datasets onto two-dimensional image datasets.

The two-dimensional difference image datasets in particular map a difference between an actual distribution of values and/or intensities in the examination volume. The two-dimensional difference image datasets are however in particular not determined by subtraction of two real image datasets. In particular other structures in the examination region outside of the vessel can be suppressed or not contained or not shown in the two-dimensional difference image datasets. In particular the edges of the vessel can be not contained and/or be suppressed in the two-dimensional difference image datasets. In particular the two-dimensional difference image datasets can show just the contrast medium or the contrast medium concentration, since (except for artifacts) only the contrast medium concentration is variable in the examination volume.

The inventors have recognized that, through the determination of two-dimensional difference image datasets, these can then be back-projected, and thus for example higher-dimensional difference image datasets can be determined especially precisely by a multiplicative back-projection.

According to a further embodiment of the invention, the first difference image dataset is four-dimensional. With this embodiment the four-dimensional first difference image dataset is determined by application of the first trained function to the two-dimensional real image datasets.

A four-dimensional difference image dataset in particular comprises a plurality of three-dimensional image datasets (in particular three-dimensional difference image datasets), wherein the four-dimensional difference image dataset in particular comprises a three-dimensional image dataset for each of the two-dimensional real image datasets and/or for each of the two-dimensional difference image datasets, or wherein the four-dimensional difference image dataset in particular comprises a three-dimensional image dataset for each two-dimensional real image dataset of a subset of the two-dimensional real image datasets and/or for each two-dimensional difference image dataset of a subset of the two-dimensional difference image datasets. In particular each of the three-dimensional image datasets of the four-dimensional difference image dataset can be assigned time information. In particular each of the two-dimensional real image datasets and/or each of the two-dimensional difference image datasets comprises time information, then each item of time information of a three-dimensional image dataset can correspond to time information of the two-dimensional real image datasets and/or each of the two-dimensional difference image datasets. In particular the four-dimensional difference image dataset can be extended in relation to three spatial dimensions and one temporal dimension, in particular the three-dimensional image datasets contained in the four-dimensional difference image dataset are extended in relation to the three spatial dimensions. The four-dimensional difference image dataset can in particular represent a temporal development of the concentration of contrast medium in the vessel in the examination volume.

In particular in this case the first trained function is a function that maps a plurality of two-dimensional image datasets to a four-dimensional image dataset. In particular the first trained function can further contain projection directions and times of recordings of two-dimensional image datasets as further input data. In particular in this case the input data of the first function comprises the two-dimensional real image datasets, and the output data of the first function comprises the four-dimensional first difference image dataset.

The inventors have recognized that, with a determination of the four-dimensional first difference image dataset of this type, further intermediate steps in the computation, such as for example a reconstruction, can be dispensed with. All intermediate steps are already contained in the first trained function. This enables the four-dimensional first difference image dataset to be determined in an especially efficient and rapid manner.

According to a further possible embodiment of the invention, the method further contains the determination of a four-dimensional second difference image dataset based on the three-dimensional first difference image dataset and the two-dimensional real image datasets, or based on the three-dimensional first difference image dataset and the two-dimensional difference image datasets, via the processing unit.

The four-dimensional second difference image dataset can in this case in particular have all advantageous embodiments and developments of the four-dimensional first difference image dataset.

The inventors have recognized that, based on the three-dimensional difference image dataset, a four-dimensional second difference image dataset can be created without having to carry out an additional masking run to record mask images. This enables the radiation load for creating a four-dimensional difference image dataset to be reduced.

According to a further embodiment of the invention, the method further contains the determination of a second difference image dataset by application of a second trained function to the input data. The input data here is based on the two-dimensional real image datasets, the two-dimensional difference image datasets and/or on the three-dimensional first difference image dataset, furthermore the second difference image dataset is four-dimensional here.

In particular the input data of the second trained function can be based on the two-dimensional real image datasets and the three-dimensional first difference image dataset, or be identical to the two-dimensional real image datasets and the three-dimensional first difference image dataset. In particular the input data of the second trained function can be based on the two-dimensional difference image datasets and the three-dimensional first difference image dataset, or be identical to the two-dimensional difference image datasets and the three-dimensional first difference image dataset.

The inventors have recognized that, by application of the second trained function, a four-dimensional second difference image dataset can be created without having to carry out an additional masking run for making mask recordings. This enables the radiation load for creating a four-dimensional difference image dataset to be reduced. Furthermore, by use of a second trained function, the four-dimensional difference image dataset can be determined more precisely and with less susceptibility to errors than for example by the use of a back-projection. In particular here imprecisions in the determination of the three-dimensional difference image dataset can be compensated for, furthermore all structures of the three-dimensional difference image dataset can be taken into account in the determination of the four-dimensional difference image dataset.

According to a further possible embodiment of the invention, the method comprises a determination of a segmented three-dimensional first difference image dataset by segmentation of the three-dimensional first difference image dataset via the processing unit. In particular the segmentation can be carried out by using a suitable transfer function. Furthermore the determination of the four-dimensional second difference image dataset then comprises a back-projection of the two-dimensional real image datasets or of the two-dimensional difference image datasets onto the segmented three-dimensional first difference image dataset.

During segmentation of the three-dimensional first difference image dataset the three-dimensional first difference image dataset will be segmented or divided up into at least two parts, wherein a first part comprises at least one vessel contained in the examination volume and comprises the inside of the vessel, and a second part comprises other components of the examination volume. The parts of the segmented three-dimensional first difference image dataset can in particular be disjoint, in particular each pixel of the three-dimensional first difference image dataset can also be allocated to precisely one part by the segmentation. In particular a segmentation can take place in precisely two parts. The first part can also comprise a number of vessels contained in the examination volume and the inside of the vessels.

A back-projection is a method that establishes data relating to the three-dimensional examination volume from one or more two-dimensional projections of a three-dimensional examination volume. The data relating to the three-dimensional examination volume can in particular involve coefficients of absorption or Hounsfield units. Since a two-dimensional projection contains less information than the three-dimensional examination volume, further information can be used for a back-projection, for example a segmentation of the examination volume.

The inventors have recognized that the four-dimensional second difference image dataset can be computed especially efficiently by the segmentation and the use of the back-projection, in particular it is not necessary here to obtain or to use training data for this step.

According to a further embodiment of the invention, the first trained function and/or the second trained function are based on a neural network. In other words the first trained function is based on a first neural network, and/or the second trained function is based on a second neural network. In general here the first neural network and the second neural network are not identical. In particular a trained function can be based on a neural network, in that the trained function is identical to the neural network or the trained function comprises the neural network.

The inventors have recognized that neural networks are especially well suited to image processing, in particular for segmentations. This means that the first trained function and/or the second trained function are especially well suited to determination of the three-dimensional difference image dataset.

According to a further embodiment of the invention, the neural network comprises a convolutional layer and/or a deconvolutional layer. In particular the first neural network comprises a convolutional layer and/or a deconvolutional layer. In particular the second neural network comprises a convolutional layer and/or a deconvolutional layer. In particular a neural network can comprise a pooling layer. In particular the first neural network and/or the second neural network can comprise a pooling layer. In particular a neural network can be a convolutional neural network. In particular a neural network can be a deep convolutional neural network.

The inventors have recognized that, through the use of convolutional layers and/or deconvolutional layers, a neural network can be employed especially efficiently for image processing, since despite many connections between node layers, only a few edge weights (namely the edge weights corresponding to the values of the convolutional kernel) have to be determined by training. With a same number of training data the accuracy of the neural network can thus also be improved.

An embodiment of the invention further relates to a method for determining a two-dimensional difference image dataset of an examination volume, comprising receiving two-dimensional real image dataset relating to the examination volume via an interface, wherein the two-dimensional real image dataset comprises a two-dimensional x-ray projection of the examination volume in relation to a projection direction, further comprising a determination of the two-dimensional difference image dataset by application of a first trained function to the two-dimensional real image dataset via a processing unit.

The inventors have recognized that two-dimensional difference image datasets can be determined by way of the first trained function without subjecting the examination volume to an additional radiation load by a mask recording. The method for determining a two-dimensional difference image dataset can in particular also be part of a method for determination of a first difference image dataset, wherein the first difference image dataset is at least three-dimensional, in particular three-dimensional or four-dimensional.

An embodiment of the invention further relates to a method for adjusting a first trained function. The method for adjusting the first trained function is based on the first trained function being received via an interface. Furthermore first two-dimensional training image datasets and second two-dimensional training image datasets of an examination volume are received via the interface. Here each of the first two-dimensional training image datasets comprises a first two-dimensional x-ray projection of the examination volume in relation to a projection direction, wherein the examination volume does not include any x-ray contrast medium during the recording of the first two-dimensional x-ray projection.

Furthermore each of the second two-dimensional training image datasets here comprises a second two-dimensional x-ray projection of the examination volume in relation to a projection direction, wherein the examination volume includes x-ray contrast medium during the recording of a second two-dimensional x-ray projection. The method for adjusting the first trained function is further based on the fact that a first training difference image dataset is determined by digital subtraction angiography based on the first and the second two-dimensional training image datasets via of a processing unit.

The method for adjusting the first trained function is furthermore based on the fact that a second training difference image dataset based on the second two-dimensional training image datasets and based on the first trained function is determined via the processing unit. The method for adjusting the first trained function is furthermore based on the fact that the trained function is adjusted via the processing unit based on a comparison of the first three-dimensional training difference image dataset and of the second three-dimensional training difference image dataset. The first trained function can in particular involve the first trained function of the method for determination of a difference image dataset. The method for adjusting the first trained function can furthermore comprise provision of the first trained function via the interface.

An image dataset can be referred to below as a real image dataset if it maps the actual distribution of values and/or intensities (e.g. Hounsfield units, coefficients of x-ray attenuation) in an examination volume. An image dataset can be referred to as a difference image dataset if it maps a difference of an actual distribution of values and/or intensities in an examination volume. A difference image dataset is however not necessarily determined by subtraction of two real image datasets. An image dataset can be referred to as a subtraction image dataset if it has been determined by subtraction of two image datasets, in particular by subtraction of two real image datasets. Therefore in particular each subtraction image dataset could be interpreted as a difference image dataset, but not every difference image dataset can be interpreted as a subtraction image dataset.

In particular each of the first two-dimensional training image datasets involves a two-dimensional real image dataset, which in particular maps a difference of an actual distribution of values and/or intensities in an examination volume. Furthermore each of the second two-dimensional training image datasets in particular involves a two-dimensional real image dataset, which in particular maps a difference of an actual distribution of values and/or intensities in an examination volume.

In particular the first training difference image dataset involves a difference image dataset, which in particular maps a difference of an actual distribution of values and/or intensities in an examination volume. In particular the first training difference image dataset involves a subtraction image dataset, which has been determined by subtraction of two image datasets, in particular by subtraction of two real image datasets. In particular the first training difference image dataset is at least three-dimensional, in particular the first training difference image dataset is three-dimensional or four-dimensional.

Furthermore the second training difference image dataset in particular involves a difference image dataset, which in particular maps a difference of an actual distribution of values and/or intensities in an examination volume, the second training difference image dataset however does not involve a subtraction image dataset. In particular the second training difference image dataset is at least three-dimensional, in particular the second training difference image dataset is three-dimensional or four-dimensional.

In particular the dimensionality of the first training difference image dataset and the dimensionality of the second training difference image dataset match. In particular the extent of the first training difference image dataset and the extent of the second training difference image dataset match in relation to each direction or each dimension.

The inventors have recognized that, by the application of digital subtraction angiography to image datasets with and without contrast medium, difference image datasets can be determined, which can be compared with the results based on the first trained function. This enables digital subtraction angiography data already present to be used for training the first trained function. This means that it is thus not necessary to record separate training data, in particular it is thus not necessary, for generation of training data, to subject additional persons to a radiation load, or a patient to a further radiation load.

An embodiment of the invention can further relate to a method for adjusting a second trained function, wherein the method comprises:

receiving the second trained function via an interface;

receiving a three-dimensional training difference image dataset of an examination volume and of two-dimensional training image datasets of the examination volume via the interface, wherein the two-dimensional training image datasets correspond to two-dimensional real image datasets or two-dimensional difference image datasets;

determining, via the processing unit, a first four-dimensional training difference image dataset by back-projection based on the three-dimensional training difference image dataset and the two-dimensional training image datasets;

determining, via the processing unit, a second four-dimensional training difference image dataset by application of the second trained function to the three-dimensional training difference image dataset and the two-dimensional training image datasets; and adjusting, via the processing unit, the second trained function based on a comparison of the first four-dimensional training difference image dataset and of the second four-dimensional training difference image dataset;

with an optional provision of the second trained function via the interface.

The second trained function can in particular involve the second trained function of the method for determination of a difference image dataset.

The inventors have recognized that the second function can be trained especially efficiently by this method, and such a trained function can be employed especially efficiently for determination of four-dimensional second difference image datasets based on three-dimensional first difference image datasets.

An embodiment of the invention further relates to a determination system for determination of a difference image dataset of an examination volume, comprising:

an interface, embodied for receiving two-dimensional real image datasets relating to an examination volume, wherein each of the two-dimensional real image datasets comprises a two-dimensional x-ray projection of the examination volume in relation to a projection direction; and a processing unit including at least one processor and/or processing circuitry, embodied for determination of the difference image dataset based on the two-dimensional real image datasets and based on a trained function, wherein the first difference image dataset is at least two-dimensional, in particular at least three-dimensional.

Such a determination system can in particular be embodied for carrying out the previously described inventive method for determining a difference image dataset and its embodiments. The determination system is embodied to carry out this method and its embodiments, in that the interface and the processing unit are embodied to carry out the corresponding method steps.

The invention further relates to an x-ray unit comprising an inventive determination system. The x-ray unit can in particular comprise an x-ray source and/or an x-ray detector. The x-ray unit can in particular involve a C-arm x-ray device.

An embodiment of the invention can further relate to a determination system for determination of a two-dimensional difference image dataset of an examination volume, comprising:

an interface, embodied for receiving a two-dimensional real image dataset relating to the examination volume, wherein the two-dimensional real image dataset comprises a two-dimensional x-ray projection of the examination volume in relation to a projection; and a processing unit including at least one processor and/or processing circuitry, embodied for determination of the two-dimensional difference image dataset by application of a first trained function to the two-dimensional real image dataset.

An embodiment of the invention further relates to a training system for adjustment of a first trained function, comprising:

an interface, embodied for receiving the first trained function, and further embodied for receiving first two-dimensional training image datasets and second two-dimensional training image datasets of an examination volume, wherein each of the first two-dimensional training image datasets comprises a two-dimensional x-ray projection of the examination volume in relation to a projection direction, wherein the examination volume does not include any x-ray contrast medium during the recording of a first two-dimensional x-ray projection, wherein each of the second two-dimensional training image datasets comprises a second two-dimensional x-ray projection of the examination volume in relation to a projection direction, and wherein the examination volume includes x-ray contrast medium during the recording of a second x-ray projection; and a processing unit including at least one processor and/or processing circuitry, embodied for determination of a first training difference image dataset by digital subtraction angiography based on the first and the second two-dimensional training image datasets, further embodied for determination of a second training difference image dataset based on the second two-dimensional training image datasets and based on the first trained function, and further embodied for adjusting the first trained function based on a comparison of the first training difference image dataset and of the second training difference image dataset.

Such a training system can be embodied in particular for carrying out the inventive method for adjusting a trained function and its embodiments previously described. The training system is embodied to carry out this method and its embodiments, in that the interface and the processing unit are embodied to carry out the corresponding method steps.

An embodiment of the invention can furthermore relate to a training system for adjusting a second trained function, comprising:

an interface, embodied for receiving the second trained function, further embodied for receiving a three-dimensional training difference image dataset of an examination volume and two-dimensional training image datasets of the examination volume, wherein the two-dimensional training image datasets correspond to two-dimensional real image datasets or two-dimensional difference image datasets, and optionally further embodied for providing the second trained function; and a processing unit, including at least one processor and/or processing circuitry, embodied for determination of a first four-dimensional training difference image dataset by back-projection based on the three-dimensional training difference image dataset and the two-dimensional training image datasets, further embodied for determination of a second four-dimensional training difference image dataset by application of the second trained function to the three-dimensional training difference image dataset and the two-dimensional training image datasets, and further embodied for adjusting the second trained function based on a comparison of the first four-dimensional training difference image dataset and of the second four-dimensional training difference image dataset.

An embodiment of the invention also relates to non-transitory computer program products with computer programs as well as non-transitory computer-readable media.

In particular, an embodiment of the invention relates to a non-transitory computer program product with a computer program, which is able to be loaded directly into a memory of a determination system and/or a training system, with program sections for carrying out all steps of the method for determination of a first difference image dataset of an embodiment and/or for carrying out all steps of the method for determination of a two-dimensional difference image dataset of an embodiment and/or for carrying out all steps of the method for training a first trained function of an embodiment, when the program sections are executed by the determination system and/or the training system.

In particular, an embodiment of the invention can also relate to a non-transitory computer program product with a computer program, which is able to be loaded directly into a memory of a determination system, with program sections for carrying out all steps of the method for determination of a first difference image dataset of an embodiment, when the program sections are executed by the determination system.

In particular, an embodiment of the invention can also relate to a non-transitory computer program product with a computer program, which is able to be loaded directly into a memory of a determination system, with program sections for carrying out all steps of the method for determination of a two-dimensional difference image dataset of an embodiment, when the program sections are executed by the determination system.

In particular, an embodiment of the invention can also relate to a non-transitory computer program product with a computer program, which is able to be loaded directly into a memory of a training system, with program sections for carrying out all steps of the method for training a first trained function of an embodiment, when the program sections are executed by the training system.

In particular, an embodiment of the invention can also relate to a non-transitory computer program product with a computer program, which is able to be loaded directly into a memory of a training system, with program sections for carrying out all steps of an embodiment of the method for training a second trained function, when the program sections are executed by the training system.

In particular, an embodiment of the invention can also relate to a non-transitory computer-readable storage medium, on which program sections able to be read and carried out by a determination system and/or a training system are stored, for carrying out all steps of the method for determination of a first difference image dataset of an embodiment and/or for carrying out all steps of the method for determination of a two-dimensional difference image dataset of an embodiment and/or for carrying out all steps of the method for training a first trained function of an embodiment, when the program sections are executed by the determination system and/or the training system.

In particular, an embodiment of the invention can also relate to a non-transitory computer-readable storage medium, on which program sections able to be read and carried out by a determination system are stored, for carrying out all steps of the method for determination of a first difference image dataset of an embodiment, when the program sections are executed by the determination system.

In particular, an embodiment of the invention can also relate to a non-transitory computer-readable storage medium, on which program sections able to be read and carried out by a determination system are stored, for carrying out all steps of the method for determination of a two-dimensional difference image dataset of an embodiment, when the program sections are executed by the determination system.

In particular, an embodiment of the invention can also relate to a non-transitory computer-readable storage medium, on which program sections able to be read and carried out by a training system are stored, for carrying out all steps of the method for training a first trained function of an embodiment, when the program sections are executed by the training system.

In particular, an embodiment of the invention can also relate to a non-transitory computer-readable storage medium, on which program sections able to be read and carried out by a training system are stored, for carrying out all steps of the method of an embodiment for training a second trained function, when the program sections are executed by the training system.

A largely software-based realization has the advantage that determination systems and/or training systems already used previously can be upgraded in a simple way by a software update in order to work in the inventive way. Such a computer program product, as well as the computer program, can if necessary comprise additional components such as e.g. documentation and/or additional components, as well as hardware components, such as e.g. hardware keys (dongles etc.) for use of the software.

An x-ray projection is a two-dimensional projection of an examination volume by way of x-ray radiation in a projection direction, which in particular can comprise a number of pixels. In this case each pixel is allocated an x-ray intensity value, which is a measure for the x-ray intensity encountered in this pixel. The x-ray intensity occurring depends on the number, the size, the shape and the material of the objects located in the examination volume.

A two-dimensional real image dataset comprises an x-ray projection, a two-dimensional real image dataset can in particular also comprise further data, in particular metadata relating to the x-ray projection (for example the time of recording of the x-ray projection, projection direction of the x-ray projection, x-ray current or x-ray voltage used for the x-ray projection, personal data of a person being examined, etc.). In particular a two-dimensional real image dataset can also be identical to an x-ray projection.

A two-dimensional difference image dataset of an examination volume can be determined from a first x-ray projection and a second x-ray projection of the examination volume, wherein the first x-ray projection and the second x-ray projection have been recorded in relation to the same projection direction, and wherein, at the time of recording of the first x-ray projection, a different distribution of contrast media is present in the examination volume from that present at the time of recording of the second x-ray projection. The two-dimensional difference image dataset can be computed from the subtraction of the x-ray intensities of the first x-ray projection and the second x-ray projection. A two-dimensional difference image dataset determined in this way can also be determined as a two-dimensional subtraction dataset. A two-dimensional difference image dataset can also be determined by way of other methods, for example by application of a trained function.

A three-dimensional image dataset of the examination volume can be reconstructed from a number of two-dimensional real image datasets or from a number of two-dimensional difference image datasets, each in relation to different projection directions. In particular a three-dimensional real image dataset can be reconstructed from a number of two-dimensional real image datasets. In particular a three-dimensional difference image dataset can be reconstructed from a number of two-dimensional difference image datasets. A three-dimensional real image dataset or a three-dimensional difference image dataset can in particular comprise a number of voxels, to which an x-ray absorption or an x-ray intensity is assigned. The x-ray absorption can be measured in Hounsfield units (HU).

In general, a reconstruction refers to a determination of an n-dimensional image dataset based on a number of m-dimensional image datasets, wherein m<n. The number of m-dimensional image datasets here are in particular projections of an n-dimensional volume, which is to be described by the n-dimensional image dataset. In particular a reconstruction can refer to the determination of a three-dimensional image dataset based on a number of two-dimensional image datasets. Such a reconstruction can be based for example on a filtered back-projection, alternatively iterative reconstruction methods are known to the person skilled in the art.

A four-dimensional difference image dataset can comprise a number of three-dimensional voxels, to which time information is assigned. In equivalent terms a four-dimensional difference image dataset can also be described by it comprising a number of three-dimensional difference image datasets, wherein time information is assigned to a three-dimensional difference image dataset. Time information can be interpreted as time coordinates, and the four-dimensional difference image dataset can be interpreted as a temporal sequence or film of three-dimensional difference image datasets.

A back projection is a method that establishes data relating to the three-dimensional examination volume from one or more two-dimensional projections of a three-dimensional examination volume. The data relating to the three-dimensional examination volume can in particular involve coefficients of absorption or Hounsfield units. Since a two-dimensional projection contains less information than the three-dimensional examination volume, further information, for example a segmentation of the examination volume or of a reconstruction volume, can be used for a back projection.

FIG. 1 shows an examination volume VOL with two vessels VES.1, VES.2, and also a three-dimensional first difference image dataset DDS-3D. Here the image region of the three-dimensional first difference image dataset DDS-3D corresponds to the examination volume VOL. In the example embodiment shown the examination volume comprises a first vessel VES.1 and a second vessel VES.2, wherein the first vessel VES.1 of the examination volume VOL divides into two branches. It is also possible for the examination volume to comprise no vessels VES.1, VES.2, precisely one vessel VES.1, VES.2 or more than two vessels VES.1, VES.2. As well as the vessels VES.1, VES.2, the examination volume VOL comprises further structures OS.1, OS.2, which are not mapped in the three-dimensional first difference image dataset DDS-3D, since these are to be classed as the background, and are therefore not mapped in the three-dimensional first difference image dataset.

In the example embodiment shown the examination volume VOL and also the three-dimensional first difference image dataset DDS-3D are extended in relation to a first direction x, a second direction y and a third direction z. The first direction x, the second direction y and the third direction z are in orthogonal pairs here.

Figure 2:
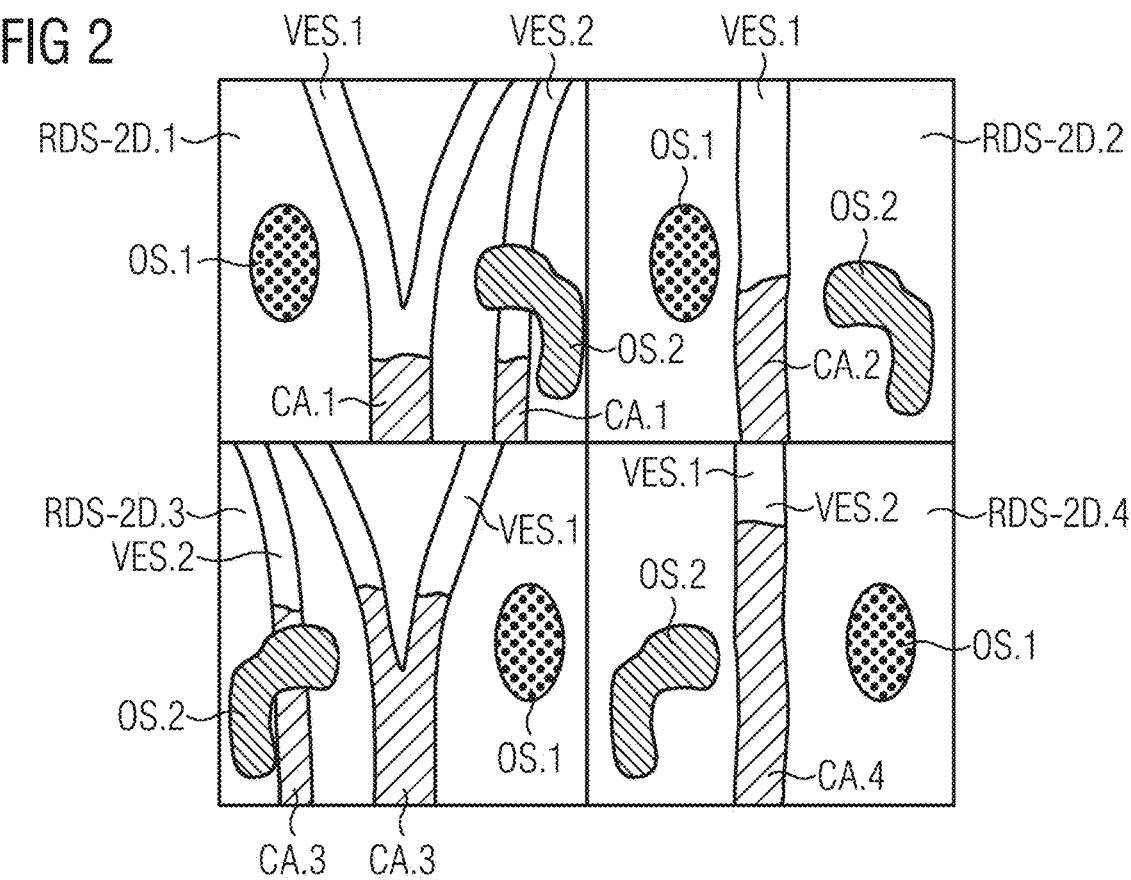
FIG. 2 shows two-dimensional real image datasets of the examination volume.
Figure 3:
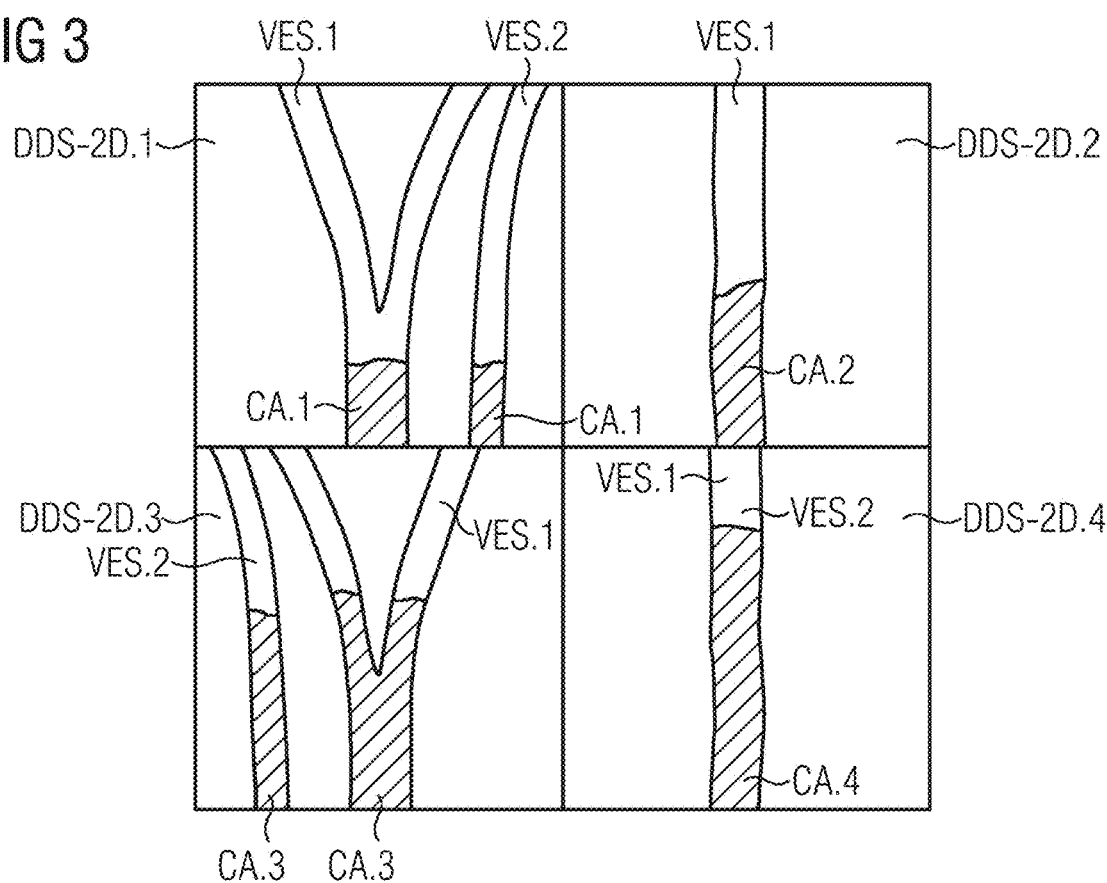
FIG. 3 shows two-dimensional difference image datasets of the examination volume.

FIG. 2 shows a number of two-dimensional real image datasets RDS-2D.1, . . . , RDS-2D.4 of the examination volume VOL, FIG. 3 shows a number of two-dimensional difference image datasets DDS-2D.1, . . . , DDS-2D.4 of the examination volume VOL. In the example embodiment shown four two-dimensional real image datasets RDS-2D.1, . . . , RDS-2D.4 are shown, more or fewer two-dimensional real image datasets RDS-2D.1, . . . , RDS-2D.4 can also be present or be used. Furthermore four two-dimensional difference image datasets DDS-2D.1, . . . , DDS-2D.4 are shown, but more or fewer two-dimensional difference image datasets DDS-2D.1, . . . , DDS-2D.4 can also be present or be used.

Each of the two-dimensional real image datasets RDS-2D.1, . . . , RDS-2D.4 here comprises an x-ray projection of the examination volume VOL in relation to a projection direction. The two-dimensional real image dataset RDS-2D.1 comprises an x-ray projection of the examination volume VOL in relation to a projection direction, wherein the projection direction is antiparallel to the first direction x. The two-dimensional real image dataset RDS-2D.2 comprises an x-ray projection of the examination volume VOL in relation to a projection direction, wherein the projection direction is antiparallel to the second direction y. The two-dimensional real image dataset RDS-2D.3 comprises an x-ray projection of the examination volume VOL in relation to a projection direction, wherein the projection direction is parallel to the first direction x. The two-dimensional real image dataset RDS-2D.4 comprises an x-ray projection of the examination volume VOL in relation to a projection direction, wherein the projection direction is parallel to the second direction y.

In the example embodiment shown each of the two-dimensional difference image datasets DDS-2D.1, . . . , DDS-2D.4 corresponds to one of the two-dimensional real image datasets RDS-2D.1, . . . , RDS-2D.4. For example the two-dimensional difference image dataset DDS-2D.1 corresponds to the two-dimensional real image dataset RDS-2D.1, the two-dimensional difference image dataset DDS-2D.2 corresponds to the two-dimensional real image dataset RDS-2D.2, the two-dimensional difference image dataset DDS-2D.3 corresponds to the two-dimensional real image dataset RDS-2D.3, and the two-dimensional difference image dataset DDS-2D.4 corresponds to the two-dimensional real image dataset RDS-2D.4.

In particular each of the two-dimensional difference image datasets DDS-2D.1, . . . , DDS-2D.4 comprises differences of intensities between one of the two-dimensional real image datasets RDS-2D.1, . . . , RDS-2D.4 and a further two-dimensional real image dataset, in particular a mask recording. For example the two-dimensional difference image dataset DDS-2D.1 comprises differences of intensities of the two-dimensional real image dataset RDS-2D.1 and a further two-dimensional real image dataset, in particular a mask recording, the two-dimensional difference image dataset DDS-2D.2 comprises differences of intensities of the two-dimensional real image dataset RDS-2D.3 and a further two-dimensional real image dataset, in particular a mask recording, the two-dimensional difference image dataset DDS-2D.3 comprises differences of intensities of the two-dimensional real image dataset RDS-2D.2 and a further two-dimensional real image dataset, in particular a mask recording and the two-dimensional difference image dataset DDS-2D.4 comprises differences of intensities of the two-dimensional real image dataset RDS-2D.4 and a further two-dimensional real image dataset, in particular a mask recording.

Furthermore each of the two-dimensional real image datasets RDS-2D.1, . . . , RDS-2D.4 is assigned a point in time, wherein this point in time in this example embodiment corresponds to the point in time of the recording of the associated x-ray projection. In particular the two-dimensional real image dataset RDS-2D.1 is thus assigned to the point in time t1 of the recording of the associated x-ray projection. In particular the two-dimensional real image dataset RDS-2D.2 is thus assigned to the point in time t2 of the recording of the associated x-ray projection. In particular the two-dimensional real image dataset RDS-2D.3 is thus assigned to the point in time t3 of the recording of the associated x-ray projection. In particular the two-dimensional real image dataset RDS-2D.4 is thus assigned to the point in time t4 of the recording of the associated x-ray projection.

In the example embodiment shown the two-dimensional difference image datasets DDS-2D.1, . . . , DDS-2D.4 are each also assigned to a point in time, in particular each of the two-dimensional difference image datasets DDS-2D.1, . . . , DDS-2D.4 is assigned to the point in time of the corresponding two-dimensional real image dataset RDS-2D.1, . . . , RDS-2D.4.

In the example embodiment shown each of the two-dimensional real image datasets RDS-2D.1, . . . , RDS-2D.4 or the assigned x-ray projection maps the vessels VES.1, VES.2 contained in the examination volume VOL. Furthermore other structures OS.1, OS.2 are mapped by the two-dimensional real image datasets RDS-2D.1, ..., RDS-2D.4.

At the points in time t1, ..., t4 of the recording of the two-dimensional real image datasets RDS-2D.1, ..., RDS-2D.4, the vessels VES.1, VES.2 comprise temporally different concentrations CA.1, ..., CA.4 of contrast medium. Here the point in time t1 is assigned the concentration CA.1, the point in time t2 is assigned the concentration CA.2, the point in time t3 is assigned the concentration CA.3, and the point in time t4 is assigned the concentration CA.4. The contrast medium here involves an x-ray contrast medium, so that the respective contrast medium concentration CA.1, ..., CA.4 of the contrast medium is able to be determined from the x-ray projections. The contrast medium concentration CA.1, ..., CA.4 changes over time by a static or dynamic fluid flow in the vessels VES.1, VES.2. In the example embodiment shown the fluid involved is blood.

In the example embodiment the two-dimensional difference image datasets DDS-2D.1, ..., DDS-2D.4 comprise differences of intensities of the two-dimensional real image datasets RDS-2D.1, ..., RDS-2D-4 and respective mask recordings. In this example embodiment the mask recordings are x-ray projections of the examination volume VOL in relation to a projection direction, wherein the projection direction corresponds to the projection direction of the x-ray projection of the respective two-dimensional real image dataset RDS-2D.1, ..., RDS-2D-4, and wherein there is no contrast medium present in the vessel VES.1, VES.2 at the time of the mask recording. It is furthermore assumed that the imaging geometry (in particular the relative positions and the relative orientations of examination volume VOL, x-ray source XRAY.SRC and x-ray detector XRAY.DTC) of the two-dimensional real image dataset RDS-2D.1, ..., RDS-2D.4 and of the associated mask recording are identical, and that no changes or movements in the examination volume VOL are present for the change of the contrast medium concentration CA.1, ..., CA.4. Deviations of projection geometry, changes or movements in the examination volume VOL are possible, but can then lead to image artifacts. The two-dimensional difference image datasets DDS-2D.1, ..., DDS-2D.4 can be determined from a subtraction of a two-dimensional real image dataset RDS-2D.1, ..., RDS-2D-4 and the respective mask recording, as an alternative the two-dimensional difference image datasets DDS-2D.1, ..., DDS-2D.4 can also be determined by application of a first trained function TF-2 to the two-dimensional real image datasets RDS-2D.1, ..., RDS-2D-4, without the x-ray projections of the mask recordings being known or actually having been recorded.

In the example embodiment shown the other structures OS.1, OS.2 of the two-dimensional real image datasets RDS-2D.1, ..., RDS-2D.4 are suppressed or not contained or not shown in the two-dimensional difference image datasets DDS-2D.1, ..., DDS-2D.4. Furthermore the edges of the vessels VES.1, VES.2, which are shown schematically in FIG. 3, are not contained or are suppressed in the two-dimensional difference image datasets DDS-2D.1, ..., DDS-2D.4 by these stipulations. In particular the two-dimensional difference image datasets DDS-2D.1, ..., DDS-2D.4 can show only the contrast medium or the contrast medium concentration CA.1, ..., CA.4, since (except for artifacts) only the contrast medium concentration CA.1, ..., CA.4 is variable in the examination volume VOL.

Figure 4:
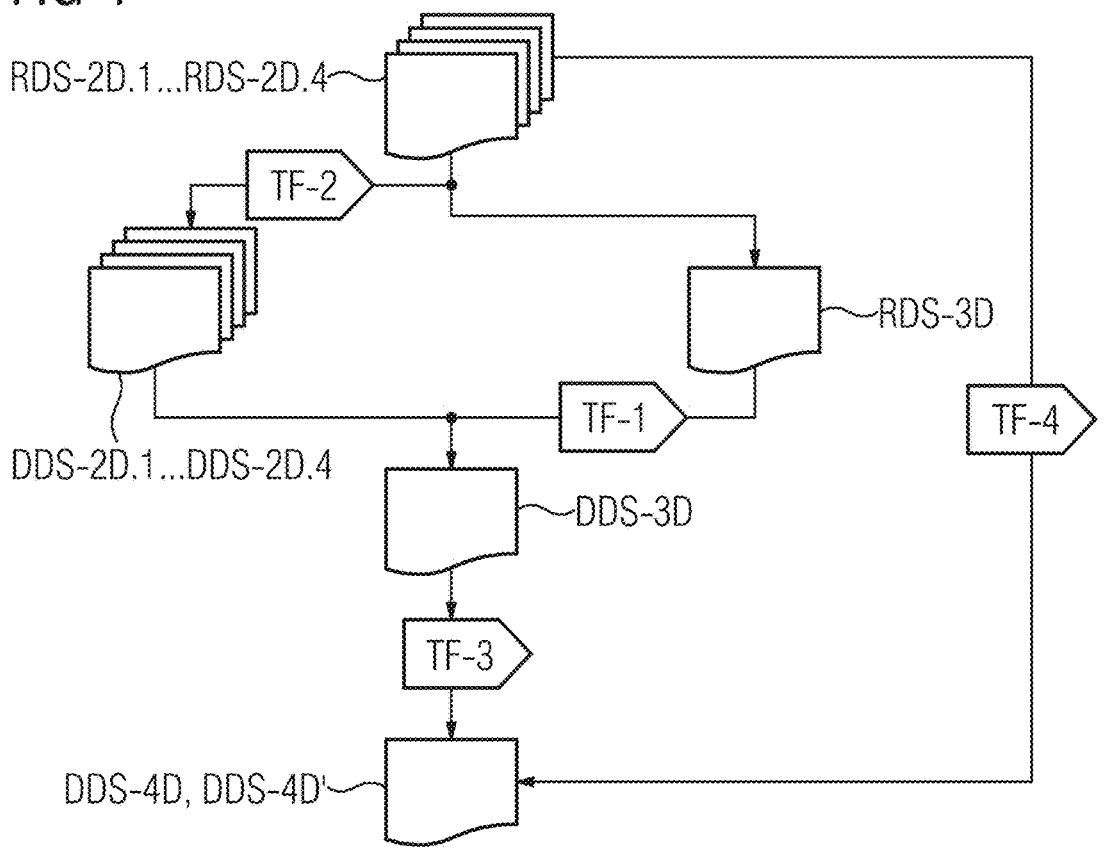
FIG. 4 shows a schematic of a first example embodiment of the dependencies of the different datasets in the inventive method.

FIG. 4 shows a schematic of a first example embodiment of the dependencies of the different datasets, which can be used as input data, output values or intermediate results of a method for determination of a first difference image dataset.

The starting point of the method for determination of a first difference image dataset are two-dimensional real image datasets RDS-2D.1, ..., RDS-2D.4 of an examination volume VOL in each case.

Based on the two-dimensional real image datasets RDS-2D.1, ..., RDS-2D.4, a three-dimensional real image dataset RDS-3D of the examination volume VOL can be determined, for example by known reconstruction algorithms. Then, starting from the three-dimensional real image dataset RDS-3D, for example by application of a first trained function TF-1 to the three-dimensional real image dataset RDS-3D, a three-dimensional first difference image dataset DDS-3D can be determined.

As an alternative, in particular by application of a first trained function TF-2 or by subtraction of a mask recording, based on the two-dimensional real image datasets RDS-2D.1, ..., RDS-2D.4, two-dimensional difference image datasets DDS-2D.1, ..., DDS-2D.4 can be determined. Then the three-dimensional first difference image dataset DDS-3D can be determined based on the two-dimensional difference image datasets DDS-2D.1, ..., DDS-2D.4, by way of known reconstruction algorithms.

Then, on the basis of the three-dimensional first difference image dataset DDS-3D, a four-dimensional second difference image dataset DDS-4D' can be determined. This determination of the four-dimensional second difference image dataset DDS-4D' can furthermore be based on the two-dimensional real image datasets RDS-2D.1, ..., RDS-2D.4 and/or the two-dimensional difference image datasets DDS-2D.1, ..., DDS-2D.4. For example the two-dimensional real image datasets RDS-2D.1, ..., RDS-2D.4 and/or the two-dimensional difference image datasets DDS-2D.1, ..., DDS-2D.4 can be back projected onto the three-dimensional first difference image dataset DDS-3D or a segmentation of the three-dimensional first difference image dataset DDS-3D.

As an alternative, in particular by application of a first trained function TF-3, based on the two-dimensional real image datasets RDS-2D.1, ..., RDS-2D.4, a four-dimensional first difference image dataset DDS-4D can be determined. In this case the intermediate step of computing a three-dimensional difference image dataset can be dispensed with.

Figure 5:
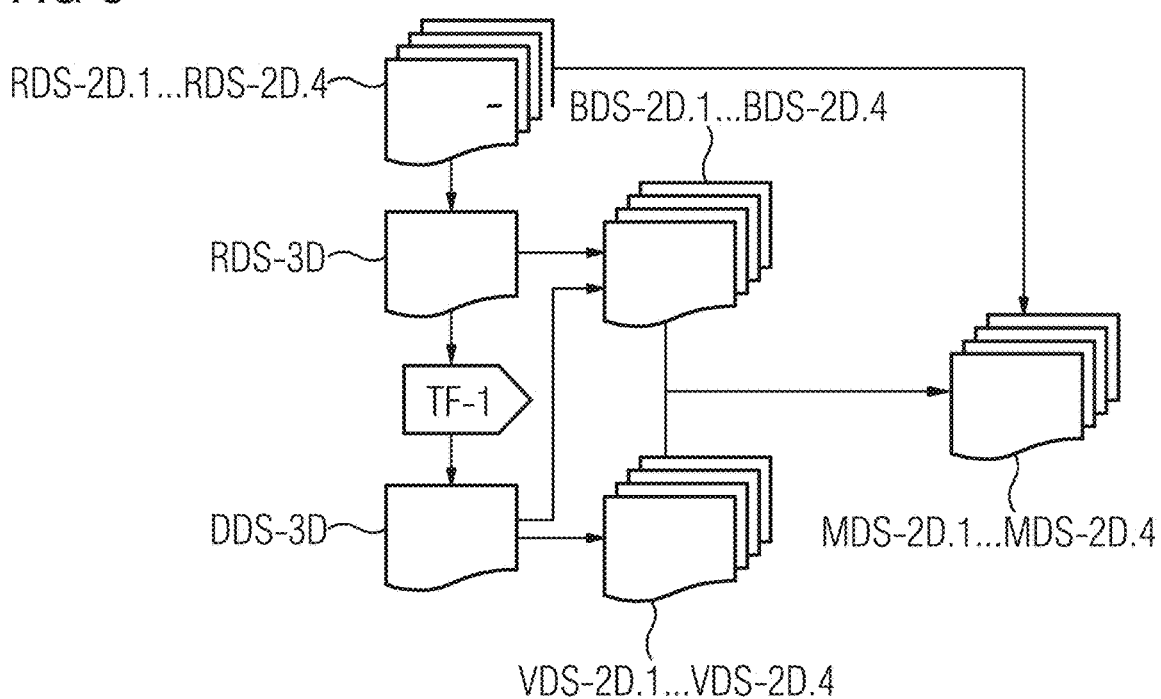
FIG. 5 shows a schematic of a second example embodiment of the dependencies of the different datasets in the inventive method.

FIG. 5 shows a schematic of a second example embodiment of the dependencies of the different datasets, which can be used as input data, output values or intermediate results of a method for determination of a first difference image dataset. Shown here in particular are the dependencies of the two-dimensional vessel image datasets VDS-2D.1, ..., VDS-2D.4 and also of the two-dimensional background image datasets BDS-2D.1, ..., BDS-2D.4.

The starting point of the method for determination of a first difference image dataset here are two-dimensional real image datasets RDS-2D.1, ..., RDS-2D.4 of an examination volume VOL in each case.

A three-dimensional real image dataset RDS-3D of the examination volume VOL can be determined based on the two-dimensional real image datasets RDS-2D.1, ..., RDS-2D.4, by known reconstruction algorithms for example. Then, starting from the three-dimensional real image dataset RDS-3D, a three-dimensional first difference image dataset DDS-3D can be determined by application of first trained function TF-1 to the three-dimensional real image dataset RDS-3D, for example.

Then, by forward projection for example, two-dimensional vessel image datasets VDS-2D.1, ..., VDS-2D.4 can be determined based on the three-dimensional first difference image dataset DDS-3D. Then, by forward projection for example, the difference of the two image datasets, two-dimensional background image datasets BDS-2D.1, ..., BDS-2D.4 can be determined based on the three-dimensional real image dataset RDS-3D and the three-dimensional first difference image dataset DDS-3D. In this second example embodiment exactly one two-dimensional vessel image dataset VDS-2D.1, ..., VDS-2D.4 and exactly one two-dimensional background image dataset BDS-2D.1, ..., BDS-2D.4 will advantageously be determined for each of the two-dimensional real image datasets RDS-2D.1, ..., RDS-2D.4, wherein the projection direction of the respective forward projection corresponds to the projection direction of the associated two-dimensional real image dataset RDS-2D.1, ..., RDS-2D.4.

Furthermore, two-dimensional modification image datasets MDS-2D.1, ..., MDS-2D.4 can be determined based on the two-dimensional real image datasets RDS-2D.1, ..., RDS-2D.4 as well as the two-dimensional vessel image datasets VDS-2D.1, ..., VDS-2D.4 and/or the two-dimensional background image datasets BDS-2D.1, ..., BDS-2D.4. In the various example embodiments of the inventive method described, the two-dimensional modification image datasets MDS-2D.1, ..., MDS-2D.4 can in particular be employed or used instead of the two-dimensional real image datasets RDS-2D.1, ..., RDS-2D.4.

Figure 6:
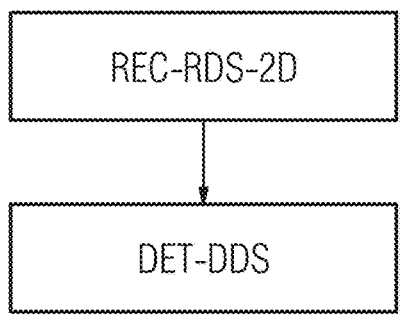
FIG. 6 shows an example embodiment of the method for determination of a first difference image dataset.

FIG. 6 shows a first example embodiment of the method for determination of a first difference image dataset DDS-3D, DDS-4D of an examination volume VOL, wherein the first difference image dataset DDS-2D.1, ..., DDS-2D.4, DDS-3D, DDS-4D is at least two-dimensional, in particular is at least three-dimensional. In this example embodiment the first difference image dataset DDS-3D, DDS-4D is three-dimensional or four-dimensional.

The first step of the first example embodiment is the receipt REC-RDS-2D of two-dimensional real image datasets RDS-2D.1, ..., RDS-2D.4 relating to an examination volume VOL via an interface SYS.IF, wherein each of the two-dimensional real image datasets RDS-2D.1, ..., RDS-2D.4 comprises a two-dimensional x-ray projection of the examination volume VOL in relation to a projection direction.

In particular the two-dimensional real image datasets RDS-2D.1, ..., RDS-2D.4 can be recorded beforehand via an x-ray device XRAY. In particular an x-ray source XRAY.SRC and/or an x-ray detector XRAY.DTC can rotate about the examination volume VOL here. In particular the x-ray source XRAY.SRC and the x-ray detector XRAY.DTC can rotate simultaneously about the examination volume. An x-ray device XRAY can in particular involve a C-arm x-ray device.

Figure 17:
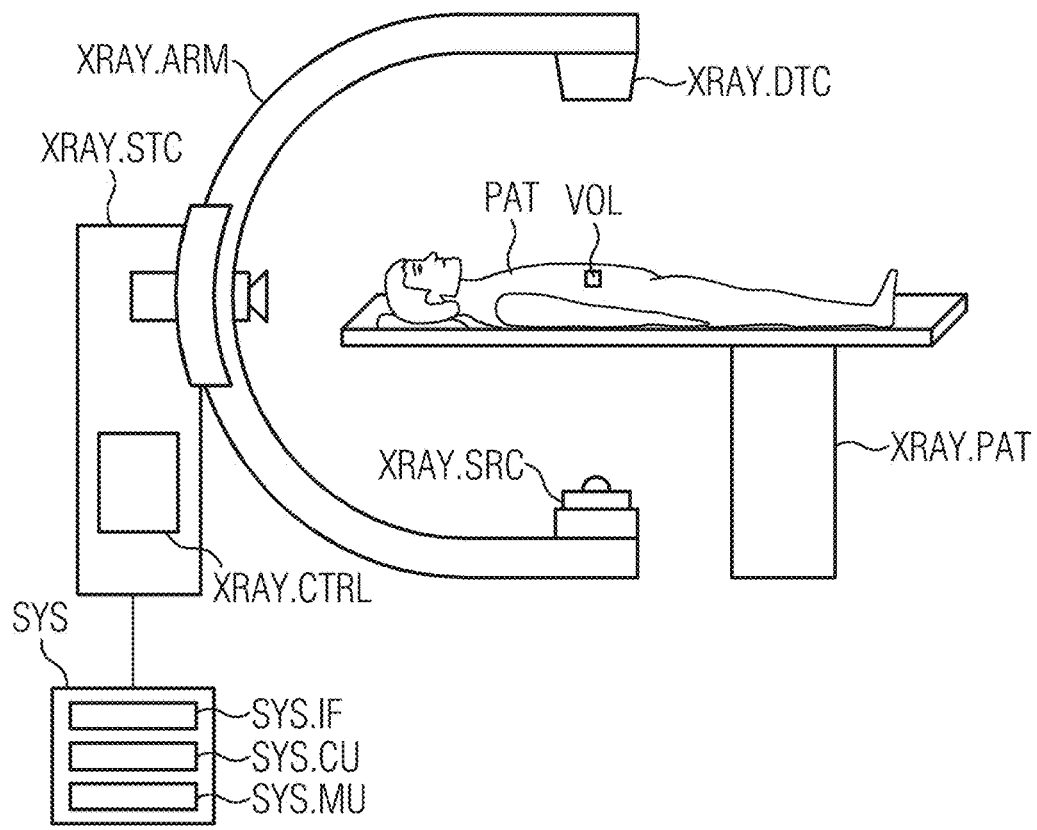
FIG. 17 shows an x-ray unit.

In the example embodiment shown the x-ray projections of the two-dimensional real image datasets RDS-2D.1, RDS-2D.4 have been recorded with a C-arm x-ray device (such a C-arm x-ray device is shown in FIG. 17). In this case the two-dimensional real image datasets RDS-2D.1, ..., RDS-2D.4 are recorded in such a way that the C-arm XRAY.ARM rotates at a predetermined angle about the examination volume VOL and the x-ray projections are recorded at constant intervals in time. If optional mask recordings are made, these mask recordings can likewise be recorded with the same projection directions with the described recording technology.

For each series of recordings the C-arm XRAY.ARM of the C-arm x-ray device XRAY rotates in this example embodiment in 12 seconds by 260° and in doing so records 304 two-dimensional real image datasets RDS-2D.1, RDS-2D.4 from different projection directions. Recording parameters comprising other rotation directions, rotation periods and projection numbers are also possible, in particular recording parameters such as lead to two-dimensional real image datasets RDS-2D.1, ..., RDS-2D.4, which are suitable for a three-dimensional reconstruction. Rotation angles that are greater than the sum of 180° and the opening angle of the x-ray beams of the x-ray source XRAY.SRC, in particular rotation angles greater than 200° are suitable in particular here.

The projection direction of an x-ray projection of one of the two-dimensional real image datasets RDS-2D.1, ..., RDS-2D.4 is designated by $v_i$ below, wherein the projection direction is a three-dimensional vector here, in particular a three-dimensional unity vector. In this first example embodiment each of the two-dimensional real image datasets RDS-2D.1, ..., RDS-2D.4 further includes a point in time $t_i$ of the recording of the respective x-ray projection.

The following relationship is then approximately valid:

$$b_{kl}(t_i) = \log\left(\frac{I_{kl}(t_i)}{I_0}\right) = -\int_{\Gamma_{kl}(v_i)} \mu(x, t_i) dx$$

Here $I_0$ is the x-ray intensity of the x-ray source, $I_{kl}(t_i)$ is the x-ray intensity in the pixel with the coordinates k, i in the x-ray detector XRAY.DTC or in the two-dimensional real image dataset RDS-2D.1, ..., RDS-2D.4 at point in time $t_i$. $\Gamma_{kl}(v_i)$ is the path from the x-ray source XRAY.SRC to the pixel with the coordinate k, i in the x-ray detector XRAY.DTC or in the two-dimensional real image dataset RDS-2D.1, ..., RDS-2D.4, if the projection direction corresponds to $v_i$ (a parallel projection can be roughly assumed here), and $\mu(x,t_i)$ is the linear coefficient of attenuation at the point or the three-dimensional coordinate x of the examination volume at point in time $t_i$. The path $\Gamma_{kl}(v_i)$ can be determined by simple geometrical considerations, furthermore the relationship can also be written continuously:

$$b(y, t_i) = \log\left(\frac{I(y, t_i)}{I_0}\right) = -\int_{\Gamma(y, v_i)} \mu(x, t_i) dx$$

$I(y, t_i)$ here is then the x-ray intensity in the two-dimensional coordinate y in the x-ray detector XRAY.DTC or in the two-dimensional real image dataset RDS-2D.1, ..., RDS-2D.4 at point in time $t_i$, and $\Gamma(y, v_i)$ is the path from the x-ray source XRAY.SRC to the point with the two-dimensional coordinate y in relation to the x-ray detector XRAY.DTC or in relation to the two-dimensional real image dataset RDS-2D.1, ..., RDS-2D.4, when the projection direction corresponds to $v_i$.

In the example embodiment shown the two-dimensional real image datasets RDS-2D.1, ..., RDS-2D.4 include the logarithm $b_{kl}(t_i)=\log(I_{kl}(t_i)/I_0)$ of the relative x-ray intensities $I_{kl}(t_i)/I_0$, as an alternative the two-dimensional real image datasets RDS-2D.1, ..., RDS-2D.4 can also include the x-ray intensities $I_{kl}(t_i)$ directly. Both alternatives can be converted into one another if the intensity $I_0$ of the x-ray source XRAY.SRC is known.

The second step of the first example embodiment is the determination DET-DDS of the first difference image dataset DDS-3D, DET-DDS based on the two-dimensional real image datasets RDS-2D.1, . . . , RDS-2D.4 and based on a trained function TF-1, TF-2, TF-3 via a processing unit SYS.CU. The determination DET-DDS here can in particular only be based on those two-dimensional real image datasets RDS-2D.1, . . . , RDS-2D.4, for which the vessel VES.1, VES.2 is completely filled, or filled to a large extent (in particular to more than 75%, in particular to more than 90%) with contrast medium.

In this example embodiment the first trained function TF-1, TF-2, TF-3 comprises at least one convolutional layer and a pooling layer. In particular the first trained function TF-1, TF-2, TF-3 comprises a convolutional neural network (abbreviated to CNN), wherein the three-dimensional real image dataset is used as the input data of the convolutional neural network. In particular the first trained function TF-1, TF-2, TF-3 can be a fully convolutional neural network (abbreviated to FCNN), wherein an FCNN is a CNN, wherein the last completely connected layer of the CNN is replaced by a convolutional layer and/or deconvolutional layer.

In particular in this first example embodiment the first difference image dataset DDS-4D can be four-dimensional, and the four-dimensional first difference image dataset DDS-4$d$ is computed by application of the first trained function TF-3 to the two-dimensional real image datasets RDS-2D.1, RDS-2D.4. The first trained function TF-3 is thus in particular a function that maps the number of two-dimensional image datasets to a four-dimensional image dataset.

Figure 7:
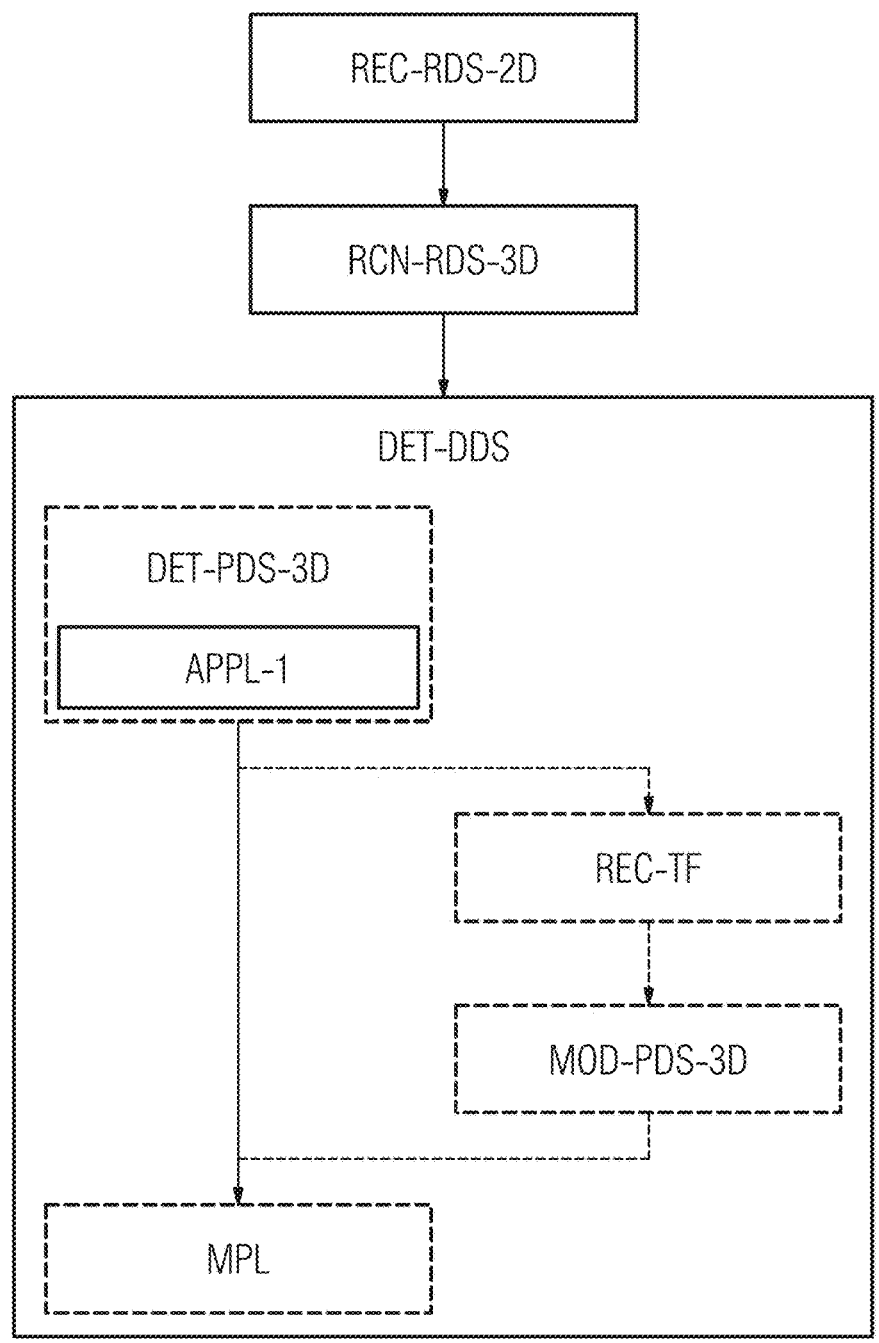
FIG. 7 shows a further example embodiment of the method for determination of a first difference image dataset.

FIG. 7 shows a second example embodiment of the method for determination of a first difference image dataset DDS-3D of an examination volume VOL, wherein in this example embodiment the first difference image dataset DDS-3D is three-dimensional. The second example embodiment comprises the steps of the receipt REC-RDS-2D of two-dimensional real image datasets RDS-2D.1, . . . , RDS-2D.4 and also the determination DET-DDS of the first difference image dataset DDS-3D, these steps can have all advantageous embodiments and developments of the corresponding steps of the first example embodiment.

The second example embodiment further comprises the reconstruction RCN-RDS-3D of a three-dimensional real image dataset RDS-3D based on the two-dimensional real image datasets RDS-2D.1, . . . , RDS-2D.4 via the processing unit SYS.CU. In this example embodiment the three-dimensional real image dataset RDS-3D is determined by application of the filtered back projection, as an alternative other reconstruction methods, in particular iterative reconstruction methods, can be used.

The reconstruction RCN-RDS-3D of the three-dimensional real image dataset RDS-3D can in particular just be based on the two-dimensional image datasets RDS-2D.1, . . . , RDS-2D.4, in which the vessel VES.1, VES.2 is filled completely or almost completely with contrast medium. As an alternative the reconstruction RCN-RDS-3D of the three-dimensional real image dataset RDS-3D can also be based on all two-dimensional image datasets RDS-2D.1, . . . , RDS-2D.4.

The intensities of the three-dimensional real image dataset RDS-3D can in particular correspond to the coefficients of x-ray absorptions or the linear coefficients of attenuation p of the reconstruction volume or of the examination volume VOL. In particular the three-dimensional real image dataset RDS-3D can take account of the time dependency of the linear coefficients of attenuation:

$$B(x) = \mu(x, t > t')$$

$$B(x) = \frac{1}{t'' - t'} \int_{t'}^{t''} \mu(x, t) dt$$

Here in the first case the intensities of the three-dimensional real image dataset RDS-3D correspond to the linear coefficients of attenuation in the examination volume after the point in time t', wherein the point in time t' can in particular correspond to the point in time, at which the vessel was completely filled with contrast medium. In the second case the intensities of the three-dimensional real image dataset RDS-3D correspond to an averaging of the linear coefficients of attenuation in the examination volume VOL over a period of t' to t". The three-dimensional real image dataset RDS-3D can in particular also be defined by discrete voxels, wherein the intensities of the voxels can be determined for example via a spatial averaging of B(x) over the volume of respective voxel.

As an alternative, in the same way the intensities of the three-dimensional real image dataset RDS-3D can also correspond to relative linear coefficients of attenuation μ of the reconstruction volume or of the examination volume VOL, in particular Hounsfield units (which are based on the linear coefficients of attenuation μ relative to linear coefficients of attenuation of water).

In the second example embodiment shown the determination DET-DDS of the three-dimensional first difference image dataset DDS-3D comprises a determination DET-PDS-3D of a three-dimensional probability dataset PDS-3D by application APPL-1 of the first trained function TF-1 to the three-dimensional real image dataset RDS-3D via the processing unit SYS.CU and also a pixel-by-pixel multiplication MPL of the three-dimensional probability dataset PDS-3D with the three-dimensional real image dataset RDS-3D via the processing unit SYS.CU Optionally in the second example embodiment the determination DET-DDS further comprises the receipt REC-TF of a transfer function via the interface SYS.IF and the modification MOD-PDS-3D of the three-dimensional probability dataset PDS-3D based on a transfer function via the processing unit SYS.CU. In particular these two steps are carried out after the determination DET-PDS-3D of a three-dimensional probability dataset PDS-3D and before the pixel-by-pixel multiplication MPL. In this case the three-dimensional real image dataset RDS-3D is multiplied by the modified three-dimensional probability dataset PDS-3D.

In this example embodiment a transfer function T is a monotonously rising function, which maps probability values in interval [0; 1] to probability values in interval [0; 1], wherein T(0)=0 and T(1)=1 applies. The transfer function T here is applied pixel-by-pixel to each probability value of the three-dimensional probability dataset. Examples for transfer functions are $T(x)=x^\gamma$ with γ>0 or ramp functions. Probability values in particular can be rescaled by transfer functions, and by a suitable choice of the transfer functions image artifacts or artifacts in the probability values can be reduced and/or suppressed.

If $B_{klm}$ refers to the three-dimensional real image dataset RDS-3D, $D_{klm}$ to the three-dimensional difference image dataset DDS-3D, and $W_{klm}$ to the three-dimensional probability dataset PDS-3D, then in this example embodiment the three-dimensional first difference image dataset DDS-3D is thus determined as follows:

$$D_{klm}=W_{klm} \cdot B_{klm}=T(F_1(B_{111}, \ldots, B_{k'l'm'}, \ldots, B_{KLM})) \cdot B_{klm}$$

Here $F_1$ is the first trained function TF-1, and K, L and M are the extent both of the three-dimensional real image dataset RDS-3D and also of the three-dimensional first difference image dataset DDS-3D in relation to the first direction x, the second direction y and the third direction z, measured in each case in the number of voxels. The argument of the function $F_1$ is to be understood such that the intensity value $D_{klm}$ of the three-dimensional first difference image dataset DDS-3D on the pixel with the indices k, l and m can be dependent on all intensity values of the three-dimensional real image dataset RDS-3D.

As an alternative the determination DET-DDS of the three-dimensional first difference image dataset DDS-3D is carried out by a first trained function TF-1 receiving as input data the three-dimensional real image dataset RDS-3D, and creating as output data the three-dimensional first difference image dataset DDS-3D. Thereby the determination DET-DDS of the three-dimensional first difference image dataset DDS-3D also comprises an application APPL-1 of the first trained function TF-1 to the three-dimensional real image dataset RDS-3D via the processing unit SYS.CU.

If $B_{klm}$ refers to the three-dimensional real image dataset RDS-3D, and $D_{klm}$ to the three-dimensional difference image dataset DDS-3D, then in this alternative the three-dimensional first difference image dataset DDS-3D is determined as follows:

$$D_{klm}=F_1(B_{111}, \ldots, B_{k'l'm'}, \ldots, B_{KLM})$$

$F_1$ here is the first trained function TF-1, and K, L and M are the extent both of the three-dimensional real image dataset RDS-3D and also of the three-dimensional first difference image dataset DDS-3D in relation to the first direction x, the second direction y and the third direction z, measured in each case in the number of voxels. The argument of the function $F_l$ is to be understood such that the intensity value $D_{klm}$ of the three-dimensional first difference image dataset DDS-3D on the pixel with the indices k, l and m can be dependent on all intensity values of the three-dimensional real image dataset RDS-3D.

Figure 8:
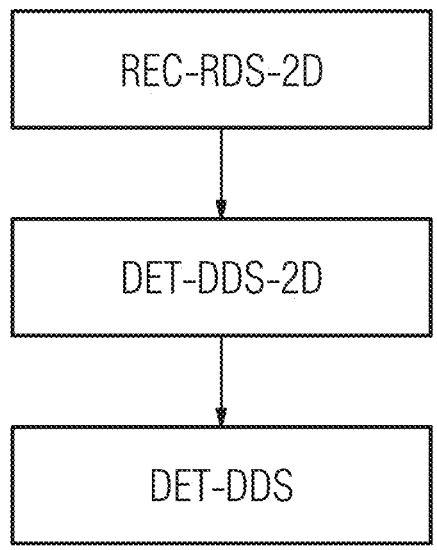
FIG. 8 shows a further example embodiment of the method for determination of a first difference image dataset.

FIG. 8 shows a third example embodiment of the method for determination of a first difference image dataset DDS-3D of an examination volume VOL, wherein the first difference image dataset is three-dimensional. The third example embodiment comprises the steps of receipt REC-RDS-2D of two-dimensional real image datasets RDS-2D.1, . . . , RDS-2D.4 and also the determination DET-DDS of the first difference image dataset DDS-3D, these steps can feature all advantageous embodiments and developments of the corresponding steps of the first or of the second example embodiment, provided these are able to be transferred to this example embodiment. The third example embodiment is also in particular able to be transferred to an example embodiment of the method for determination of a two-dimensional difference image dataset DDS-2D.1, . . . , DDS-2D.4 of an examination volume VOL, comprising a plurality of supplementary optional steps, in particular the step of the determination DET-DDS of the first difference image dataset DDS-3D is optional here.

Furthermore the third example embodiment of the method for determination of a three-dimensional first difference image dataset DDS-3D of an examination volume VOL comprises the step of the determination DET-DDS-2D of two-dimensional difference image datasets DDS-2D.1, . . . , DDS-2D.4 by application of the first trained function TF-2 to the two-dimensional real image datasets RDS-2D.1, . . . , RDS-2D.4 via the processing unit SYS.CU. In this case the determination DET-DDS of the three-dimensional first difference image dataset DDS-3D further comprises a reconstruction of the three-dimensional first difference image dataset DDS-3D based on the two-dimensional difference image datasets DDS-2D.

Unlike in the first and the second example embodiment, the transition from real image datasets to difference image datasets does not occur in the third example embodiment in the three-dimensional (i.e. from three-dimensional real image dataset RDS-3D to three-dimensional difference image dataset DDS-3D), but in the two-dimensional (i.e. from the two-dimensional real image datasets RDS-2D.1, . . . , RDS-2D.4 to the two-dimensional difference image datasets DDS-2D.1, . . . , DDS-2D.4).

In this case the trained function TF-2 can be trained in particular based on two-dimensional training real image datasets and associated two-dimensional training subtraction image datasets, wherein the two-dimensional training subtraction image datasets are determined by subtraction of a two-dimensional training real image dataset and an associated two-dimensional training mask recording in each case. Here the two-dimensional training real image datasets are used as input data for the trained function TF-2, and the output data for the trained function TF-2 is compared with the associated two-dimensional training subtraction image datasets. In particular a suitable comparative cost function can then be used for the training, for example the sum of the quadratic deviations of the pixel values.

Figure 9:
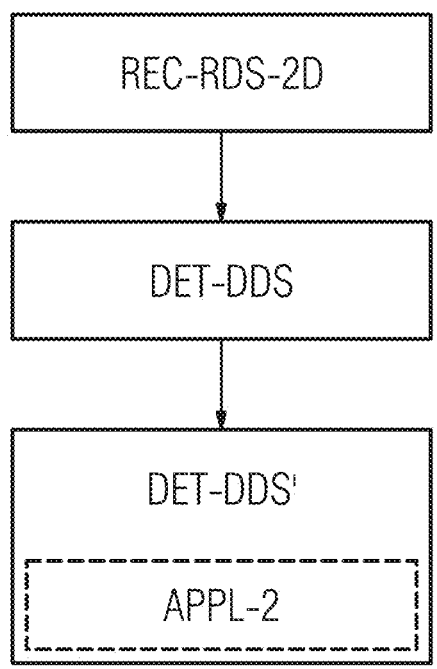
FIG. 9 shows a further example embodiment of the method for determination of a first difference image dataset, wherein furthermore a second difference image dataset is determined.

FIG. 9 shows a fourth example embodiment of a method for determination of a first difference image dataset DDS-3D of an examination volume VOL, wherein a four-dimensional second difference image dataset DDS-4D' of the examination volume VOL is also determined in this fourth example embodiment.

The fourth example embodiment here comprises the steps of the receipt REC-RDS-2D of two-dimensional real image datasets RDS-2D.1, . . . , RDS-2D.4 as well as the determination DET-DDS of the three-dimensional first difference image dataset DDS-3D, these steps can feature all advantageous embodiments and developments of the corresponding steps of the first, of the second and/or of the third example embodiment. Furthermore the fourth example embodiment can comprise further steps and substeps of the first, of the second and/or of the third example embodiment.

The fourth example embodiment furthermore comprises the determination DET-DDS' of a four-dimensional second difference image dataset DDS-4D' based on the three-dimensional first difference image dataset DDS-3D and the two-dimensional real image datasets RDS-2D, or based on the three-dimensional first difference image dataset DDS-3D and the two-dimensional difference image datasets DDS-2D, via the processing unit SYS.CU.

For example the four-dimensional second difference image dataset DDS-4D' can be determined by normalization of the two-dimensional difference image datasets DDS-2D.1, . . . , DDS-2D.4 based on the three-dimensional difference image dataset DDS-3D and by back projection (in particular by multiplicative back projection) of the two-dimensional difference image datasets DDS-2D.1, . . . , DDS-2D.4 onto the three-dimensional first difference image dataset DDS-3D.

The normalization is produced in this example embodiment by the following functional relationship:

$$d_N(t, u) = \frac{d(t, u)}{\int_{L(t,u)} D(l) dl}$$

Here u is a two-dimensional spatial coordinate in the coordinate system of the x-ray detector 302 and t is a temporal coordinate, thus in particular time information. Furthermore D refers to the three-dimensional first difference image dataset DDS-3D, and D(x) to the value of the three-dimensional first difference image dataset DDS-3D at the spatial coordinate x. The one-dimensional path L(t,u) corresponds to the straight line through the punctiform x-ray source XRAY.SRC and the point u on the x-ray detector XRAY.DTC at recording time t. The path L(t,u) is furthermore dependent on the temporal coordinate t, because in the normal case the spatial position of the x-ray source XRAY.SRC and of the x-ray detector XRAY.DTC change with the temporal coordinate t. The variable d(t,u) describes the intensity value of the two-dimensional difference image dataset DDS-2D.1, . . . , DDS-2D.4 recorded at recording time t in the detector coordinate u. The result DN(t,u) is the normalized intensity value of the two-dimensional difference image dataset DDS-2D.1, . . . , DDS-2D.4 recorded at recording time t in the detector coordinate u.

Furthermore the multiplicative back projection is produced by the following functional relationship:

$$D_{4D}(t, x) = Seg[D](x) \frac{p_N(t, A(t, x))}{K * \int_{L(t, A(t,x))} D(l) dl}$$

Here x is a three-dimensional spatial coordinate and t a temporal coordinate, thus in particular time information. The tupel (t,x) can therefore also be interpreted as a four-dimensional coordinate. Furthermore, D refers to the three-dimensional first difference image dataset DDS-3D, and D(x) to the value of the three-dimensional first difference image dataset DDS-3D at the spatial coordinate x. Furthermore A(t,x) refers to the projection of the spatial coordinate x at recording time t onto a spatial two-dimensional detector coordinate u=A(t,x) of an x-ray detector XRAY.DTC. Furthermore K refers to an optional convolutional kernel, the operator * to a convolution and Seg[D](x) refers to a segmentation (or to the value of this segmentation at the spatial coordinate x) of the three-dimensional first difference image dataset DDS-3D. As an alternative to the segmentation the three-dimensional first difference image datasets DDS-3D can also be used directly. Furthermore D4d(t,x) refers to the value of the four-dimensional second difference image dataset DDS-4D' at the spatial coordinate x and at the temporal coordinate t.

In the example embodiment shown the segmentation Seg[D] of the three-dimensional first difference image dataset DDS-3D is a threshold value segmentation, thus all voxels of the three-dimensional difference image dataset DDS-3D with Hounsfield units above the threshold value are assigned to a first region or to a first part, which in particular can correspond to one or more vessels, furthermore all voxels of the three-dimensional first difference image dataset DDS-3D with Hounsfield units below the threshold value are assigned to a second region or to a second region. However other methods of segmentation are also possible, for example region growing or active shape models. The result of the segmentation or of the segmented three-dimensional first difference image dataset Seg[D] can be interpreted as function Seg[D], wherein the function Seg[D] assigns a value Seg[D] (x) to a voxel with the spatial three-dimensional coordinate x, if the voxel lies in the first region, wherein the value Seg[D](x) corresponds to the value of the voxels in the second DSA dataset, and wherein the function Seg[D] assigns a value of Seg[D](x)=0 to a voxel with the spatial three-dimensional coordinate x, if the voxel lies in the second region. Accordingly the result of a segmentation or of the segmented three-dimensional first difference image dataset Seg[D] can again be interpreted as an image dataset.

As an alternative the four-dimensional second difference image dataset DDS-4D can also be determined by normalization of the two-dimensional real image datasets RDS-2D based on the three-dimensional first difference image dataset DDS-3D and by back projection (in particular by multiplicative back projection) of the two-dimensional real image datasets RDS-2D onto the three-dimensional first difference image dataset DDS-3D. The normalization and the back projection can be carried out in this case in a similar way to the case of the two-dimensional difference image datasets RDS-2D.

Once again as an alternative the determination DET-DDS' of the four-dimensional second difference image dataset DDS-4D' can comprise an application APPL-2 of a second trained function TF-4 to input data, wherein the input data is based on the two-dimensional real image datasets RDS-2D, the two-dimensional difference image datasets DDS-2D.1, . . . , DDS-2D.4 and/or on the three-dimensional first difference image dataset DDS-3D.

In this example embodiment the second trained function TF-4 is a deep neural network, which receives as its input data the two-dimensional real image datasets RDS-2D and the three-dimensional first difference image dataset DDS-3D, and creates as its output the four-dimensional second difference image dataset DDS-4D'. This second trained function TF-4 can be trained in particular by comparing its output values and four-dimensional training difference image datasets, wherein the four-dimensional training difference image datasets are determined by application of normalization and of a multiplicative back projection based on the two-dimensional real image datasets RDS-2D and the three-dimensional first difference image dataset DDS-3D.

Figure 10:
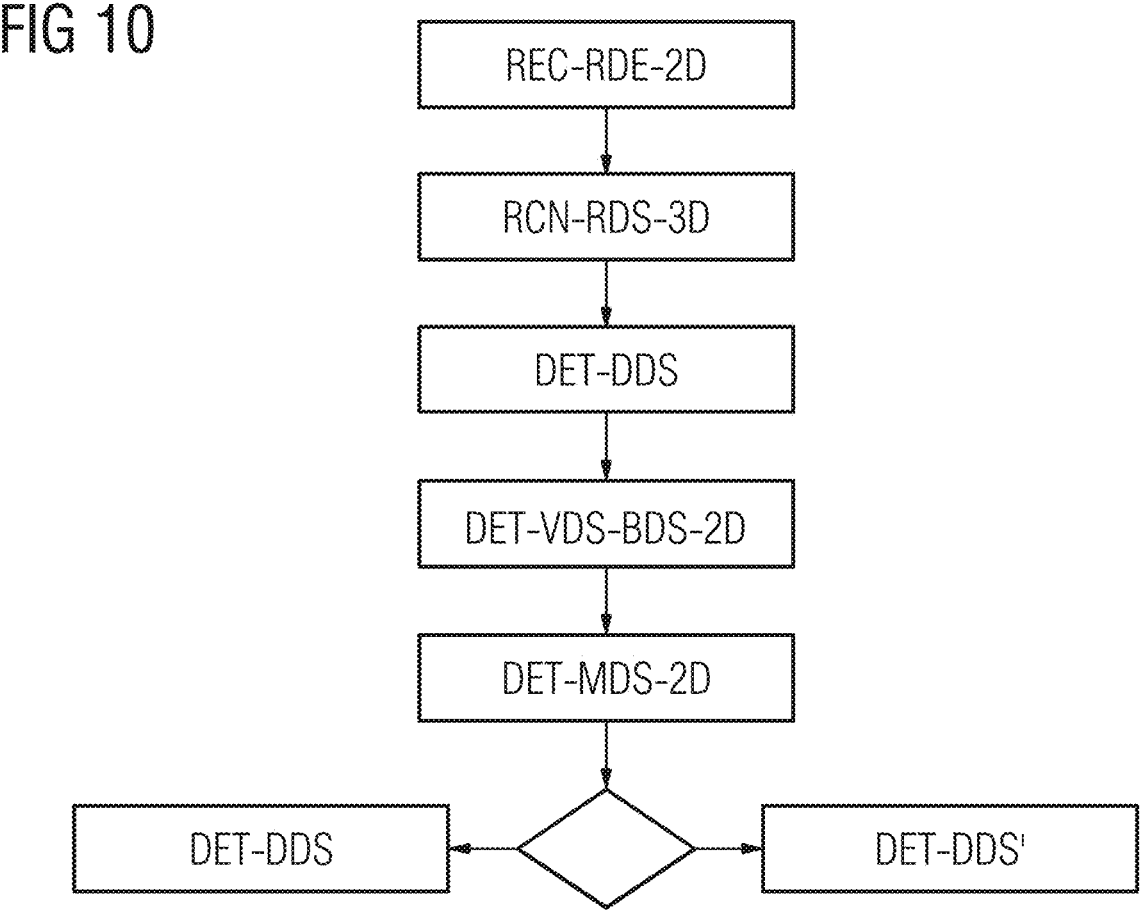
FIG. 10 shows a further example embodiment of the method for determination of a first difference image dataset, wherein a second difference image dataset can optionally be defined.

FIG. 10 shows a fifth example embodiment of a method for determination of a first difference image dataset DDS-3D of an examination volume VOL, wherein a four-dimensional second difference image dataset DDS-4D' of the examination volume VOL can also be determined in this fourth example embodiment.

The fifth example embodiment here comprises the steps of the receipt REC-RDS-2D of two-dimensional real image datasets RDS-2D.1, . . . , RDS-2D.4, the reconstruction REC-RDS-3D of a three-dimensional real image dataset RDS-3D and also the determination DET-DDS of the three-dimensional first difference image dataset DDS-3D, these steps can feature all advantageous embodiments and developments of the corresponding steps of the first, of the second, of the third and/or of the fourth example embodiment. Furthermore the fifth example embodiment can comprise further steps and substeps of the first, of the second, of the third and/or of the fourth example embodiment.

The fifth example embodiment further comprises the determination DET-VDS-BDS-2D of two-dimensional vessel image datasets VDS-2D.1, . . . , VDS-2D.4 and/or of two-dimensional background image datasets BDS-2D.1, . . . , BDS-2D.4 based on the three-dimensional first difference image dataset DDS-3D and/or the three-dimensional real image dataset RDS-3D. In particular the fifth example embodiment can comprise the determination DET-VDS-BDS-2D of two-dimensional vessel image datasets VDS-2D.1, ..., VDS-2D.4 based on the three-dimensional first difference image dataset DDS-3D and/or of two-dimensional background image datasets BDS-2D.1, ..., BDS-2D.4 based on the three-dimensional first difference image dataset DDS-3D and the three-dimensional real image dataset RDS-3D.

In the fifth example embodiment the two-dimensional vessel image datasets VDS-2D.1, ..., VDS-2D.4 are determined by forward projection of the three-dimensional first difference image dataset DDS-3D, and/or the two-dimensional background image datasets BDS-2D.1, ..., BDS-2D.4 are determined by forward projection of a difference of the three-dimensional real image dataset RDS-3D and of the three-dimensional first difference image dataset DDS-3D. In particular the two-dimensional vessel image datasets VDS-2D.1, ..., VDS-2D.4 can be determined by the specification $$b_v(y,v) = \int_{\Gamma(y,v)} D(x) dx$$

wherein $b_v(y,v)$ refers to the value of the two-dimensional vessel image datasets VDS-2D.1, ..., VDS-2D.4 in relation to the projection direction v at the coordinate y, wherein $D(x)$ refers to the three-dimensional first difference image dataset DDS-3D, and wherein $\Gamma(y,v)$ refers to the straight line through the point y with the projection direction v. In particular the two-dimensional background image datasets BDS-2D.1, ..., BDS-2D.4 can be determined by the specification $$b_b(y,v) = \int_{\Gamma(y,v)} [B(x) - D(x)] dx$$

wherein $b_b(y,v)$ refers to the value of the two-dimensional background image datasets BDS-2D.1, ..., BDS-2D.4 in relation to the projection direction v at the coordinate y, wherein $D(x)$ refers to the three-dimensional first difference image dataset DDS-3D, wherein $B(x)$ refers to the three-dimensional real image dataset, and wherein $\Gamma(y,v)$ refers to the straight line through the point y with the projection direction v.

In this fifth example embodiment precisely one two-dimensional vessel image dataset VDS-2D.1, ..., VDS-2D.4 and also precisely one two-dimensional background image dataset BDS-2D.1, ..., BDS-2D.4 is determined for each of the two-dimensional real image datasets RDS-2D.1, ..., RDS-2D.4. The projection direction of the precisely one two-dimensional vessel image dataset VDS-2D.1, ..., VDS-2D.4 and also of the precisely one two-dimensional background image dataset BDS-2D.1, ..., BDS-2D.4 corresponds to the projection direction of the corresponding two-dimensional real image dataset RDS-2D.1, ..., RDS-2D.4.

A further step of the fifth example embodiment is the determination DET-MDS-2D of two-dimensional modification image datasets MDS-2D.1, ..., MDS-2D.4 based on the two-dimensional vessel image datasets VDS-2D.1, ..., VDS-2D.4 and/or the two-dimensional background image datasets BDS-2D.1, ..., BDS-2D.4. In particular the two-dimensional modification image datasets MDS-2D.1, ..., MDS-2D.4 can also be based on the two-dimensional real image datasets RDS-2D.1, ..., RDS-2D.4.

In the example embodiment shown a two-dimensional vessel image dataset VDS-2D.1, ..., VDS-2D.4 and a two-dimensional background image dataset BDSD-2D.1, ..., BDSD-2D.4 is assigned in each case to one of the two-dimensional real image datasets RDS-2D.1, ..., RDS-2D.4. These three image datasets in particular form a triple of datasets. Each of the two-dimensional modification image datasets MDS-2D.1, ..., MDS-2D.4 is based in this case on one of these triples.

In particular the determination of the two-dimensional modification image datasets is based on the application of a trained function, which receives the triple as its input data, and outputs as its output data one of the two-dimensional modification image datasets MDS-2D.1, ..., MDS-2D.4. The trained function thus in particular maps one or more two-dimensional image datasets to a two-dimensional result image dataset. As an alternative the two-dimensional modification image datasets MDS-2D.1, ..., MDS-2D.4 can also be identical to the two-dimensional vessel image datasets VDS-2D.1, ..., VDS-2D.4.

As an alternative just one (or more) of the two-dimensional vessel image datasets VDS-2D.1, ..., VDS-2D.4 and one (or more) of the two-dimensional background datasets BDS-2D.1, ..., BDS-2D.4 can be used as input data of the trained function. As an alternative just one (or more) of the two-dimensional real image datasets RDS-2D.1, ..., RDS-2D.4 and one (or more) of the two-dimensional vessel image datasets VDS-2D.1, ..., VDS-2D.4 can be used as input data of the trained function. As an alternative just one (or more) of the two-dimensional real image datasets RDS-2D.1, ..., RDS-2D.4 and one (or more) of the two-dimensional background datasets BDS-2D.1, ..., BDS-2D.4 can be used as input data of the trained function.

After the determination DET-MDS-2D of the two-dimensional modification image datasets MDS-2D.1, ..., MDS-2D.4 steps of the other example embodiments can then be carried out in particular, wherein in particular the two-dimensional modification image datasets MDS-2D.1, ..., MDS-2D.4 are used instead of the two-dimensional real image datasets RDS-2D.1, ..., RDS-2D.4. Three alternatives are demonstrated here for the fifth example embodiment, but naturally other alternatives are also possible at any time.

In a first alternative the determination DET-DDS of the first difference image dataset DDS-2D.1, ..., DDS-2D.4, DDS-3D, DDS-4D based on the two-dimensional modification image datasets MDS-2D.1, ..., MDS-2D.4 and based on a first trained function TF-1, TF-2, TF-3 is carried out via a processing unit SYS.CU in a similar way to the first example embodiment, wherein the first difference image dataset DDS-2D.1, ..., DDS-2D.4, DDS-3D, DDS-4D is at least two-dimensional, in particular at least three-dimensional. (In this alternative of the fifth example embodiment the step of the determination DET-DDS of the first difference image dataset DDS-3D, DDS-4D is thus carried out twice, but based on different data in each case).

In a second alternative the determination DET-DDS' of a second difference image dataset DDS-4D' by application of a second trained function TF-4 to input data is carried out in a similar way to the fourth example embodiment, wherein the input data is based on the two-dimensional modification image datasets RDS-2D.1, ..., RDS-2D.4 and/or on the three-dimensional first difference image dataset DDS-3D, and wherein the second difference image dataset DDS-4D' is four-dimensional.

Figure 11:
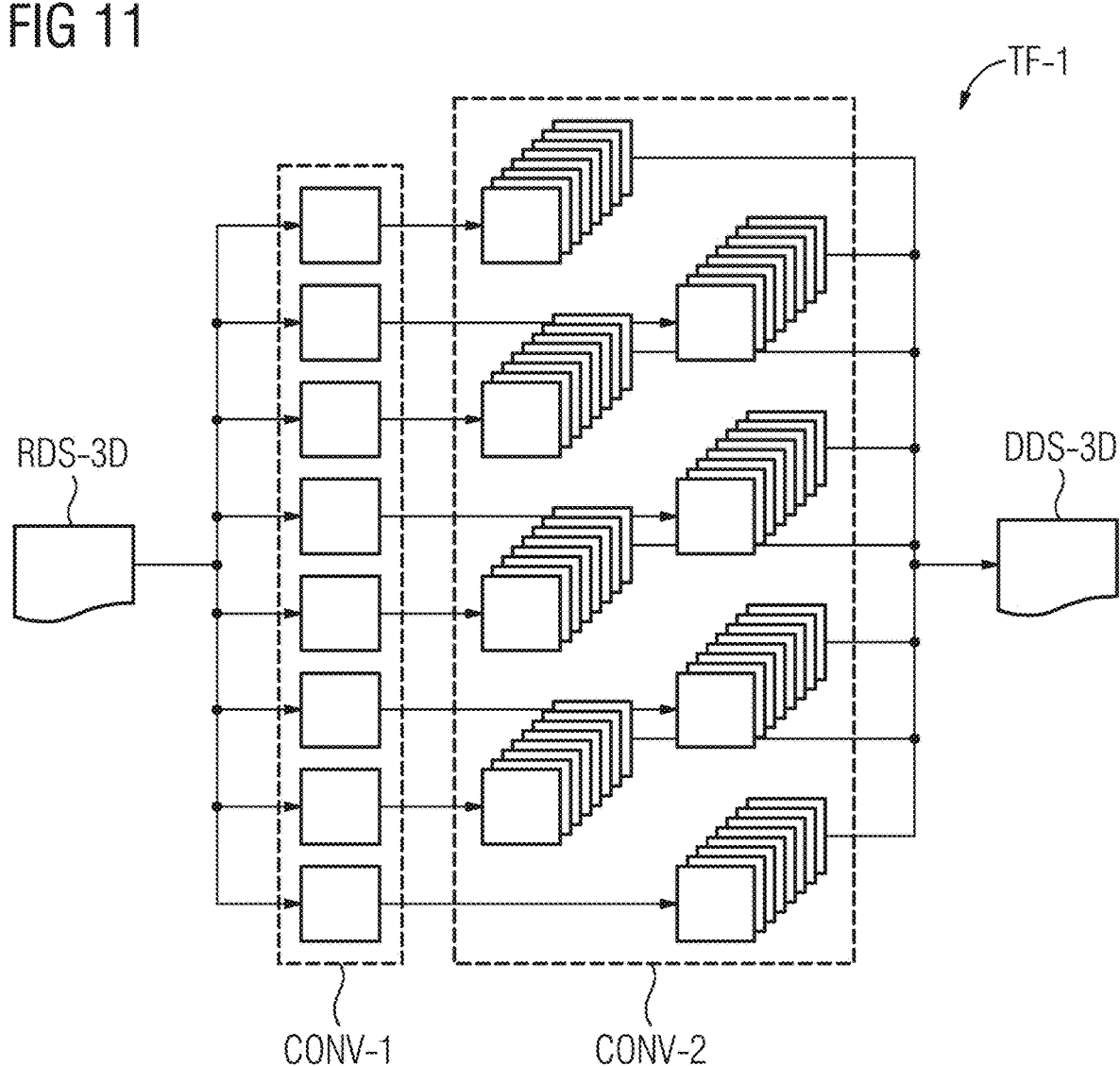
FIG. 11 shows a first trained function.

FIG. 11 shows an example embodiment of a first trained function TF-1. In this example embodiment the first trained function TF-1 is an artificial neural network, in particular a convolutional artificial neural network. The first trained function TF-1 receives as its input data a three-dimensional real image dataset RDS-3D, and creates as its output data a three-dimensional first difference image dataset DDS-3D.

The trained function TF-1 in this example embodiment comprises a first convolutional layer CONV-1 and a second convolutional layer CONV-2. The trained function TF-1 can however naturally comprise even more convolutional layers and also other layers, for example pooling layers. Both the first convolutional layer CONV-1 and also the second convolutional layer CONV-2 in this example embodiment comprise eight convolutional kernels, which correspond to the weights of the artificial neural network. Naturally other and in particular different numbers of convolutional kernels are also possible.

Figure 12:
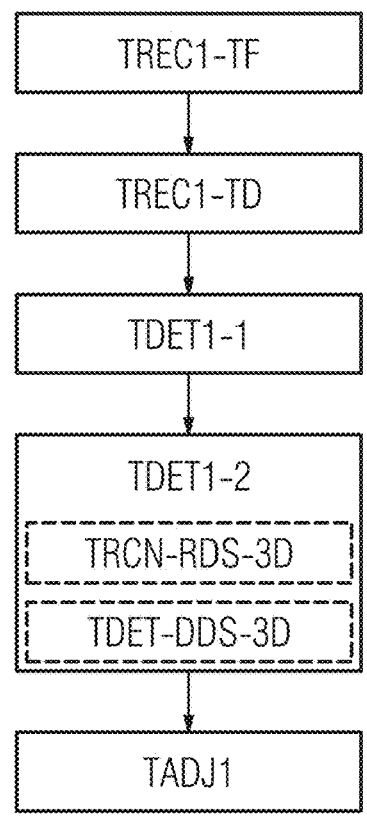
FIG. 12 shows an example embodiment of the method for adjustment of a first trained function.
Figure 13:
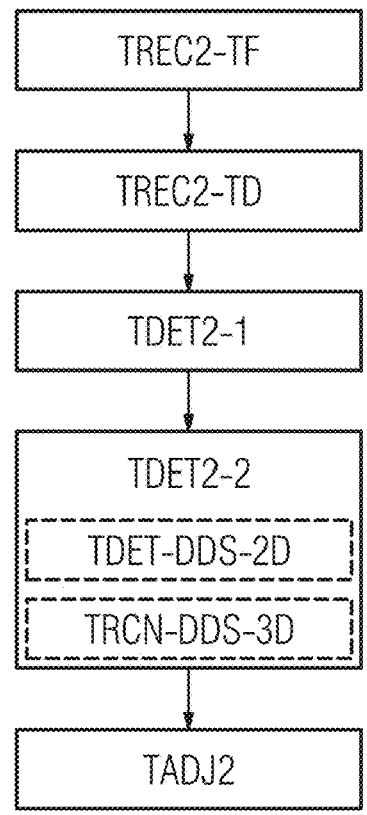
FIG. 13 shows a further example embodiment of the method for adjustment of a first trained function.
Figure 14:
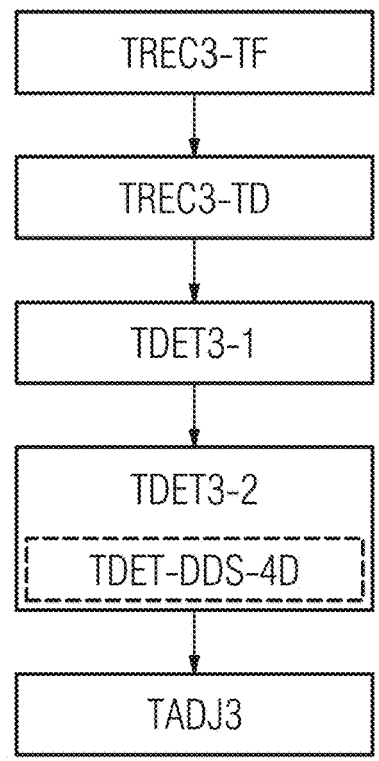
FIG. 14 shows a further example embodiment of the method for adjustment of a first trained function, FIG. 15 an example embodiment of the method for adjustment of a second trained function.

FIG. 12, FIG. 13 and FIG. 14 show a first example embodiment, a second example embodiment and a third example embodiment of a method for training a first trained function TF-1, TF-2, TF-3. In the first example embodiment the first trained function TF-1 maps a three-dimensional image dataset to a further three-dimensional image dataset, in particular the first trained function TF-1 in this example embodiment maps a three-dimensional real image dataset RDS-3D to a three-dimensional first difference image dataset DDS-3D. In the second example embodiment the first trained function TF-2 maps a two-dimensional image dataset to a further two-dimensional image dataset, in particular the first trained function TF-2 in this example embodiment maps a two-dimensional real image dataset RDS-2D.1, . . . , RDS-2D.4 to a two-dimensional difference image dataset DDS-2D.1, . . . , DDS-2D.4. In the third example embodiment the first trained function TF-3 maps a number of two-dimensional image datasets to a four-dimensional image dataset, in particular the first trained function TF-1 in this example embodiment maps a number of two-dimensional real image datasets 2D.1, . . . , RDS-2D.4 to a four-dimensional first difference image dataset.

The first step of the first, of the second and of the third example embodiment is the receipt TREC1-TF, TREC2-TF, TREC3-TF of the first trained function TF-1, TF-2, TF-3 via an interface TSYS.IF. In these example embodiments the first trained function TF-1, TF-2, TF-3 is already pre-trained, i.e. one or more parameters of the first trained function TF-1, TF-2, TF-3 have already been adjusted by the training method described and/or by another training method. As an alternative the one or more parameters of the first trained function TF-1, TF-2, TF-3 can have been not yet adjusted by training data, in particular the one or more parameter can be occupied by a constant value and/or by a random value. In particular all parameters of the first trained function TF-1, TF-2, TF-3 can have been not yet adjusted by way of training data, in particular all parameters can be occupied by a constant value and/or by a random value.

The second step of the first, of the second and of the third example embodiment is the receipt TREC1-TD, TREC2-TD, TREC3-TD of first two-dimensional training image datasets and of second two-dimensional training image datasets of an examination volume VOL via the interface TSYS.IF.

Each of the first two-dimensional training image datasets here comprises a two-dimensional x-ray projection of the examination volume VOL in relation to a projection direction, wherein the examination volume VOL does not include any x-ray contrast medium during the recording of a first two-dimensional x-ray projection. In particular each of the first two-dimensional training image datasets can comprise the projection direction of the respective x-ray projection. In particular a recording time of the assigned first x-ray projection can be assigned to each of the first two-dimensional training image datasets, or each of the first two-dimensional training image datasets can include this recording time. In particular each of the first two-dimensional training image datasets is thus a two-dimensional real image dataset.

Furthermore each of the second two-dimensional training image datasets comprises a second two-dimensional x-ray projection of the examination volume VOL in relation to a projection direction here, wherein the examination volume VOL includes x-ray contrast media during the recording of a second x-ray projection. In particular each of the second two-dimensional training image datasets can include the projection direction of the respective x-ray projection. In particular a recording time of the assigned second x-ray projection can be assigned to each of the second two-dimensional training image datasets, or each of the second two-dimensional training image datasets can include this recording time. In particular each of the second two-dimensional training image datasets is thus a two-dimensional real image dataset.

In particular a second two-dimensional training image dataset of the two-dimensional training image datasets can be assigned to the each of the first two-dimensional training image datasets, wherein the projection directions of the respective first x-ray projection and of the respective second x-ray projection match.

The third step of the first, of the second and of the third example embodiment is the determination TDET1-1, TDET2-1, TDET3-1 of a first training difference image dataset $D_1(x)$ or $D_1(x, t)$ by digital subtraction angiography based on the first and the second two-dimensional training image datasets via a processing unit TSYS.CU. In the first and in the second example embodiment the first training difference image dataset $D_1(x)$ is three-dimensional, in the third example embodiment the first training difference image dataset $D_1(x, t)$ is four-dimensional.

In this example embodiment the projection directions of the x-ray projections of the first two-dimensional training image datasets correspond to the projection directions of the x-ray projections of the second two-dimensional training image datasets. Therefore a two-dimensional training difference image dataset $d^{(k)}(y)=b_2^{(k)}(y)-b_1^{(k)}(y)$ can be computed by subtraction of the first two-dimensional training image dataset $b_1^{(1)}(y), \ldots, b_1^{(m)}(y)$ from the second two-dimensional training image dataset $b_2^{(1)}(y), \ldots, b_2^{(m)}(y)$ for each first two-dimensional training image dataset $b_1^{(1)}(y), \ldots, b_1^{(m)}(y)$ of the first two-dimensional training image datasets or for each second two-dimensional training image dataset $b_2^{(1)}(y), \ldots, b_2^{(m)}(y)$ of the second two-dimensional training image datasets. Based on a number of the two-dimensional training difference image datasets $d^{(1)}(y), \ldots, d^{(m)}(y)$, the first training difference image dataset $D_1(x)$ or $D_1(x, t)$ can then be determined by a digital subtraction angiography. y here refers to a two-dimensional coordinate, and x refers to a three-dimensional coordinate. Furthermore in the four-dimensional case t refers to the temporal coordinate. $b^{(k)}(y):=b_2^{(k)}(y)$ is also used as abbreviated notation below.

The fourth step of the first, of the second and of the third example embodiment is the determination TDET1-2, TDET2-2, TDET3-2 of a second training difference image dataset $D_2(x)$ or $D_2(x, t)$ based on the second two-dimensional training image datasets $b^{(1)}(y), \ldots, b^{(m)}(y)$ and based on the first trained function TF-1, TF-2, TF-3 via the processing unit TSYS.CU. In the first and in the second example embodiment the second training difference image dataset $D_2(x)$ is three-dimensional, in the third example embodiment the second training difference image dataset $D_2(x, t)$ is four-dimensional.

In the first example embodiment a three-dimensional training image dataset B(x) is determined here by reconstruction TRCN-RDS-3D of the second two-dimensional training image datasets $b^{(1)}(y), \ldots, b^{(n)}(y)$, wherein the three-dimensional training image dataset B(x) is a three-dimensional real image dataset. Subsequently, by application TDET-DDS-3D of the first trained function TF-1 to the three-dimensional training image dataset B(x) the second three-dimensional training difference image dataset $D_2(x)$ is determined, i.e. the following applies $$D_2(x)=TF_1(B(x))=TF_1(Rec(b^{(1)}(y), \ldots b^{(n)}(y))).$$

Rec refers to the reconstruction operator here.

In the second example embodiment a two-dimensional training difference image dataset $b^{(1)}(y), \ldots, b^{(n)}(y)$ is determined here by application TDET-DDS-2D of the first trained function TF-2 from each of the second two-dimensional training image datasets $d^{(1)}(y), \ldots d^{(n)}(y)$, wherein each of the two-dimensional training difference image datasets is a two-dimensional difference image dataset, but not a two-dimensional subtraction image dataset. Subsequently the second three-dimensional training difference image dataset $D_2(x)$ is determined by reconstruction TRCN-DDS-3D of the two-dimensional training difference image datasets $b^{(1)}(y), \ldots, b^{(n)}(y)$, i.e. the following applies $$D_2(x)=Rec(TF_2(d^{(1)}(y)), \ldots, TF_2(d^{(n)}(y))).$$

In the third example embodiment the four-dimensional second training difference image dataset $D_2(x, t)$ is determined here by application TDET-DDS-4D of the first trained function TF-3 to the totality of the second two-dimensional training image datasets $d^{(1)}(y), \ldots, d^{(n)}(y)$, i.e. the following applies $$D_2(x,t)=TF_3(b^{(1)}(y), \ldots, b^{(n)}(y))$$

The fifth step of the first, of the second and of the third example embodiment is adjustment TADJ1, TADJ2, TADJ3 of the first trained function TF-1, TF-2, TF-3 based on a comparison of the first training difference image dataset D1(x) or D1(x, t) and of the second training difference image dataset $D_2(x)$ or $D_2(x, t)$ via the processing unit TSYS.CU.

In the first and second example embodiment the comparison of the first three-dimensional training difference image dataset $D_1(x)$ and of the second three-dimensional training difference image dataset $D_2(x)$ is based on the pixel-by-pixel difference of the first three-dimensional training difference image dataset $D_1(x)$ and of the second three-dimensional training difference image dataset $D_2(x)$, for example on the sum of the quadratic deviations DIF:

$$DIF=\iiint (D_1(x)-D_2(x))^2 dx$$

The triple integration can also be interpreted here as a sum of the pixels arranged three-dimensionally. One or more parameters of the trained function TF-1, TF-2 are then adjusted here in such a way that the sum of the quadratic deviations DIF is minimized, for example by way of a backpropagation. It can be necessary here to carry out the backpropagation not only in the trained function TF-1, TF-2, but also by the respective reconstruction operator. Numeric methods for this are known to the person skilled in the art for example.

In the second example embodiment it is alternatively also possible for one or more parameters to be adjusted based on a comparison of the output values $TF_2(b_2(y))$ of the second trained function TF-2 on application to the second training image datasets $b_2(y)$ and the two-dimensional training difference image datasets $d(y)=b_2(y)-b_1(y)$. In particular the sum of the quadratic deviations of the output values $TF_2(b_2(y))$ and of the two-dimensional training difference image datasets d(y) can be minimized here by backpropagation.

In the third example embodiment the temporal dimension of the first training difference image dataset and of the second training difference image dataset are furthermore also included during the comparison. For example the sum of the quadratic deviations can be calculated as $$DIF=\int [\iiint (D_1(x,t)-D_2(x,t))^2 dx]dt.$$

This sum of the quadratic deviations can likewise be determined discretely by a four-dimensional sum of all pixels.

Figure 15:
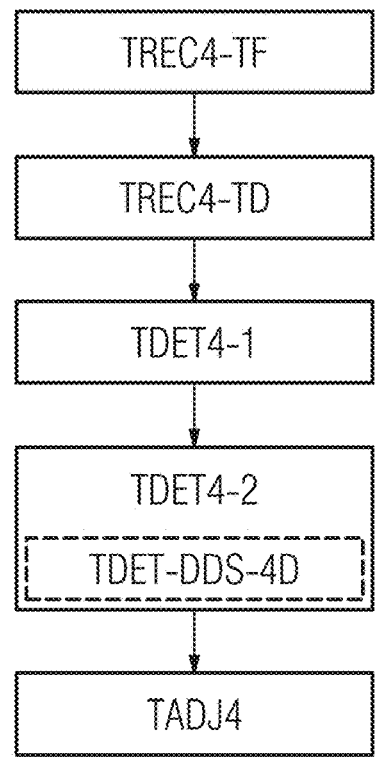

FIG. 15 shows an example embodiment of a method for adjustment of a second trained function.

The first step of the example embodiment is the receipt TREC4-TF of the second trained function TF-4 via an interface TSYS.IF. In this example embodiment the second trained function TF-4 maps a three-dimensional image dataset and a plurality of two-dimensional image datasets to a four-dimensional image dataset, in particular a three-dimensional first difference image dataset DDS-3D and a plurality of two-dimensional difference image datasets DDS-2D.1, . . . , DDS-2D.4 to a four-dimensional second difference image dataset DDS-4D'. As an alternative the second trained function TF-4 can also map a three-dimensional first difference image dataset DDS-3D and a plurality of two-dimensional real image datasets RDS-2D.1, . . . , RDS-2D.4 to a four-dimensional second difference image dataset DDS-4D'. In this example embodiment the second trained function TF-2 is already pre-trained, i.e. one or more parameters of the second trained function TF-2 have already been adjusted by the training method described and/or by another training method. As an alternative the one or more parameters of the second trained function TF-2 can be not yet adjusted by way of training data, in particular the one or more parameters can be occupied by a constant value and/or by a random value. In particular all parameters of the second trained function TF-4 can be not yet adjusted by way of training data, in particular all parameters can be occupied by a constant value and/or by a random value.

The second step of the example embodiment is the receipt TREC4-TD of a three-dimensional training difference image dataset D(x) of an examination volume VOL and of two-dimensional training image datasets of the examination volume VOL via the interface TSYS.IF, wherein the two-dimensional training image datasets correspond to two-dimensional real image datasets $b^{(1)}(y), \ldots, b^{(n)}(y)$ or two-dimensional difference image datasets $d^{(1)}(y), \ldots, d^{(n)}(y)$. In particular the two-dimensional training image datasets comprise x-ray projections of the examination volume VOL in relation to different projection directions and assigned recording times.

The third step of the example embodiment is the determination TDET4-1 of a first four-dimensional training difference image dataset $D_1(x, t)$ by back projection based on the three-dimensional training difference image dataset D(x) and the two-dimensional training image datasets $b^{(1)}(y), \ldots, b^{(n)}(y)$ or $d^{(1)}(y), \ldots, d^{(n)}(y)$ via a processing unit TSYS.CU. The multiplicative back projection can in particular be carried out here with the method described for FIG. 9.

The fourth step of the example embodiment is the determination TDET3-2 of a second four-dimensional training difference image dataset $D_2(x,t)$ by application TDET-DDS-4D of the second trained function TF-4 to the three-dimensional training difference image dataset D(x) and the two-dimensional training image datasets $b^{(1)}(y), \ldots, b^{(n)}(y)$ or $d^{(1)}(y), \ldots, d^{(n)}(y)$ via the processing unit TSYS.CU. The second four-dimensional training difference image dataset $D_2(x,t)$ is then given by $$D_2(x,t)=TF_4(D(x),b^{(1)}(y), \ldots ,b^{(n)}(y))$$

or by $$D_2(x,t)=TF_4(D(x),d^{(1)}(y), \ldots d^{(n)}(y)).$$

The fifth step of the example embodiment is the adjustment TADJ4 of the second trained function TF-4 based on a comparison of the first four-dimensional training difference image dataset $D_1(x,t)$ and of the second four-dimensional training difference image dataset $D_2(x,t)$ via the processing unit TSYS.CU. The adjustment is done in this example embodiment in a similar way to the steps TADJ1, TADJ2 or TADJ3 of FIG. 12 to FIG. 14.

Figure 16:
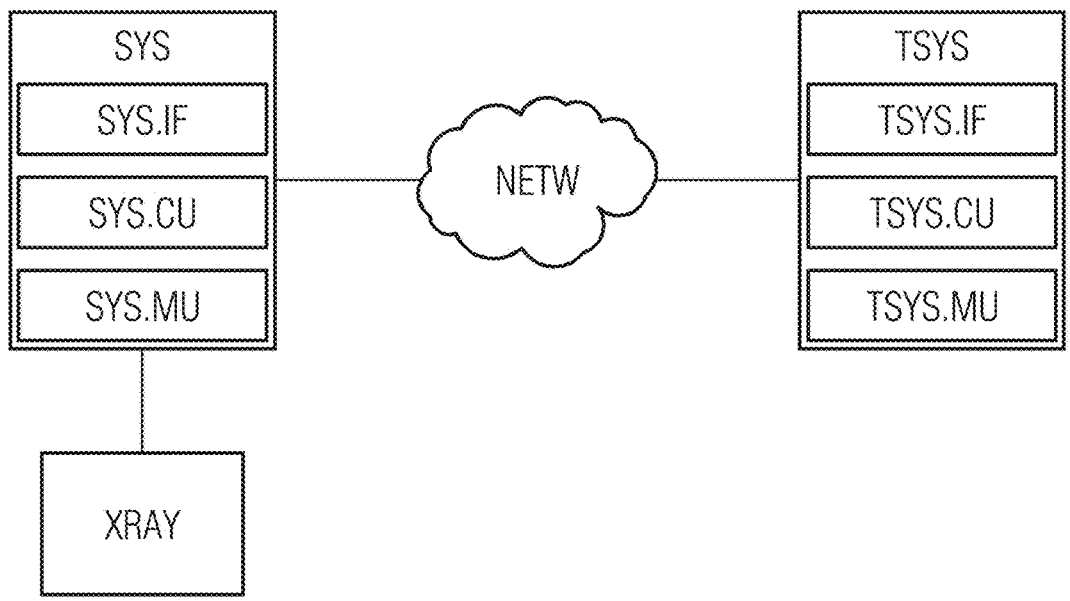
FIG. 16 shows a determination system and a training system.

FIG. 16 shows a determination system SYS for determination of a three-dimensional difference image dataset DDS-3D as well as a training system TSYS for training of a first trained function TF-1, TF-2, TF-3 and/or of a second trained function TF-4. The determination system SYS shown here and the training system TSYS shown here are embodied to carry out one or more of the inventive methods. The determination system SYS comprises an interface SYS.IF, a processing unit SYS.CU and also a memory unit SYS.MU. The training system TSYS comprises an interface TSYS.IF, a processing unit TSYS.CU and also a memory unit TSYS.MU.

The determination system SYS and/or the training system TSYS can in particular involve a computer, a microcontroller or an integrated circuit. As an alternative the determination system SYS and/or the training system TSYS can involve a real or virtual network of computers (a real network is referred to as a cluster, a virtual network is referred to as a cloud). An interface SYS.IF, TSYS.IF can involve a hardware or software interface (for example PCI-Bus, USB or Firewire). A processing unit SYS.CU, TSYS.CU can have hardware elements or software elements, for example a microprocessor or what is known as an FPGA (acronym for Field Programmable Gate Array). A memory unit SYS.MU, TSYS.MU can be realized as a volatile main memory (Random Access Memory, abbreviated to RAM) or as permanent mass storage (hard disk, USB stick, SD card, solid state disk). Optionally the determination system SYS and/or the training system TSYS can further comprise an input and output unit, wherein an input and output unit comprises at least one input unit and/or at least one output unit.

In the example embodiment shown the determination system SYS is connected via a network NETW to the training system ISYS, furthermore the determination system SYS is connected directly to an x-ray unit XRAY. The connection to x-ray unit XRAY can however also be established via the network NETW. The determination system SYS can however also be a part of x-ray unit XRAY. Furthermore the communication between the determination system SYS and the training system TSYS can also be undertaken offline, for example by an exchange of data media. A communication between the determination system and the training system TSYS can for example consist of the determination system SYS transferring further training data to the training system TSYS, or of the training system TSYS transferring the first trained function TF-1, TF-2, TF-3 and/or the second trained function TF-4 to the determination system SYS. Furthermore the training system TSYS can be connected to other data sources, in particular to a local or distributed PACS (acronym for Picture Archiving and Communication System).

The determination system SYS shown here is embodied to carry out the example embodiments of the method for determining a three-dimensional difference image dataset DDS-3D, in that the interface SYS.IF and the processing unit SYS.CU are embodied to carry out the respective steps of the method. The training system TSYS shown here is embodied to carry out the example embodiments of the method for training a first trained function TF-1, TF-2, TF-3 and/or a second trained function TF-4, in that the interface TSYS.IF and the processing unit TSYS.CU are embodied to carry out the respective steps of the method.

The network NETW can involve a Local Area Network, abbreviated to LAN, or a Wide Area Network, abbreviated to WAN. An example of a Local Area Network is an intranet, an example of a Wide Area Network is the Internet. The network NETW can in particular also be designed as a wireless network, in particular as a WLAN (for Wireless LAN, usually referred to by the abbreviation WiFi) or as a Bluetooth connection. The network NETW can also be designed as a combination of the examples.

FIG. 17 shows x-ray unit XRAY connected to a determination system SYS. In the example embodiment shown the x-ray unit XRAY is a C-arm x-ray device XRAY. The C-arm x-ray device XRAY comprises an x-ray source XRAY.SRC for emitting the x-ray radiation. Furthermore the C-arm x-ray device XRAY comprises an x-ray detector XRAY.DTC for receiving x-ray radiation. The x-ray source XRAY.SRC and also the x-ray detector XRAY.DTC are fastened to the two different ends of the C-arm XRAY.ARM. The C-arm XRAY.ARM of the C-arm x-ray device XRAY is fastened to a stand XRAY.STC. The stand XRAY.STC comprises drive elements, which are designed to alter the position of the C-arm XRAY.ARM. In particular the C-arm XRAY.ARM can be rotated around two different axes. The C-arm x-ray device further comprises a control and evaluation unit XRAY.CTRL as well as a patient support device XRAY.PAT, on which the patient PAT can be supported. Via the control and evaluation unit XRAY.CTRL the position of the C-arm XRAY.ARM can be set and the C-arm XRAY.ARM rotated about the examination volume VOL. Furthermore via the control and evaluation unit XRAY.CTRL two-dimensional x-ray projections of the first examination volume VOL can be recorded and evaluated. As an alternative to the example embodiment shown it is also possible for the determination system SYS to be designed as part of the control and evaluation unit XRAY.CTRL.

Figure 18:
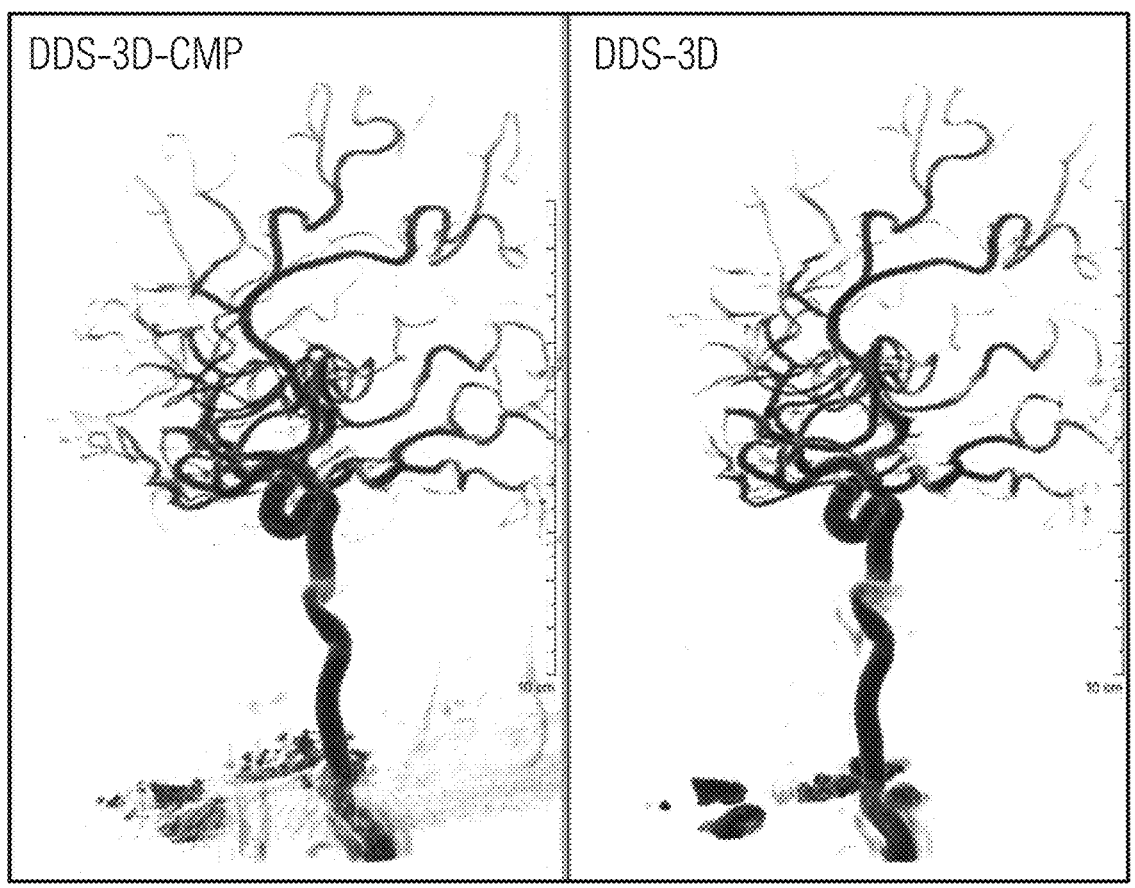
FIG. 18 shows a three-dimensional difference image dataset and a comparison image dataset.

FIG. 18 shows a diagram of a three-dimensional first difference image dataset DDS-3D and also a diagram of a comparison image dataset DDS-3D-CMP, wherein the comparison image dataset is three-dimensional. The three-dimensional first difference image dataset DDS-3D has been determined with the example embodiment of the method for determination of a difference image dataset DDS-3D based on two-dimensional real image datasets RDS-2D.1, . . . , RDS-2D.4 shown and described in FIG. 7, wherein no mask recordings have been used. The comparison image dataset has been determined based on the two-dimensional real image datasets RDS-2D.1, . . . , RDS-2D.4 as well as mask recordings by known digital subtraction angiography.

Where it has not yet explicitly occurred, but is sensible and in the spirit of the invention, individual example embodiments, individual of their part aspects or features can be combined with one another or exchanged, without departing from the framework of the present invention. Where they are able to be transferred, advantages of the invention described with regard to an example embodiment also apply to other example embodiments, without this being explicitly stated.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining a first difference image dataset of an examination volume, comprising:
   receiving, via an interface, two-dimensional real image datasets relating to the examination volume, each of the two-dimensional real image datasets including a two-dimensional x-ray projection of the examination volume in relation to a projection direction;
   reconstructing, via the processor, a three-dimensional real image dataset based on the two-dimensional real image datasets received; and
   determining, via a processor, the first difference image dataset based on the two-dimensional real image datasets received and based on a first trained function, the first difference image dataset being at least three-dimensional,
   wherein the determining of a three-dimensional first difference image dataset includes an application of the first trained function to the three-dimensional real image dataset, via the processor.

2. The method of claim 1, further comprising:
   determining, via the processor, a three-dimensional probability dataset by application of the first trained function to the three-dimensional real image dataset, wherein the determining of the three-dimensional first difference image dataset includes a pixel-by-pixel multiplication of the three-dimensional probability dataset and the three-dimensional real image dataset, via the processor.

3. The method of claim 2, further comprising:
   receiving a transfer function, via the interface; and
   modifying the three-dimensional probability dataset, via the processor, based on the transfer function.

4. The method of claim 1, further comprising:
   determining at least one of two-dimensional vessel image datasets and two-dimensional background image datasets based on at least one of the three-dimensional first difference image dataset and the three-dimensional real image dataset; and
   determining two-dimensional modification image datasets based on the at least one of the two-dimensional vessel image datasets and the two-dimensional background image datasets determined.

5. The method of claim 4, wherein at least one of
   the two-dimensional vessel image datasets are determined by forward projection of the three-dimensional first difference image dataset, and
   the two-dimensional background image datasets are determined by forward projection of a difference of the three-dimensional real image dataset and of the three-dimensional first difference image dataset.

6. The method of claim 5, further comprising:
   determining a four-dimensional second difference image dataset based on the two-dimensional modification image datasets and the three-dimensional first difference image dataset.

7. The method of claim 4, further comprising:
   determining a four-dimensional second difference image dataset based on the two-dimensional modification image datasets and the three-dimensional first difference image dataset.

8. The method of claim 1, further comprising:
   determining a second difference image dataset by application of a second trained function to input data, wherein the input data is based on at least one of the two-dimensional real image datasets, the two-dimensional difference image datasets and the three-dimensional first difference image dataset, wherein the second difference image dataset is four-dimensional.

9. The method of claim 8, wherein at least one of the first trained function and the second trained function are based on a neural network, and wherein the neural network includes at least one of a convolutional layer and a deconvolutional layer.

10. A non-transitory computer program product storing a computer program, directly loadable into a memory of at least one of a determination system and a training system, the computer program including program sections to carry out the method of claim 1 when the program sections are carried out by the at least one of the determination system and the training system.

11. A non-transitory computer-readable storage medium, storing program sections, readable and executable by at least one of a determination system and a training system, to carrying out the method of claim 1 when the program sections are carried out by the at least one of the determination system and the training system.

12. The method of claim 1, wherein the first difference image dataset is at least three-dimensional.

13. The method of claim 1, wherein the first trained function is based on a neural network, and wherein the neural network includes at least one of a convolutional layer and a deconvolutional layer.

14. A method for determining a first difference image dataset of an examination volume, comprising:
- receiving, via an interface, two-dimensional real image datasets relating to the examination volume, each of the two-dimensional real image datasets including a two-dimensional x-ray projection of the examination volume in relation to a projection direction;
- determining, via the processor, two-dimensional difference image datasets by application of the first trained function to the two-dimensional real image datasets; and
- determining, via a processor, the first difference image dataset based on the two-dimensional real image datasets received and based on a first trained function, the first difference image dataset being at least three-dimensional,
- wherein the determining of a three-dimensional first difference image dataset includes a reconstruction based on the two-dimensional difference image datasets.

15. A non-transitory computer program product storing a computer program, directly loadable into a memory of at least one of a determination system and a training system, the computer program including program sections to carry out the method of claim 14 when the program sections are carried out by the at least one of the determination system and the training system.

16. A non-transitory computer-readable storage medium, storing program sections, readable and executable by at least one of a determination system and a training system, to carrying out the method of claim 14 when the program sections are carried out by the at least one of the determination system and the training system.

17. A method for determining a first difference image dataset of an examination volume, comprising:
- receiving, via an interface, two-dimensional real image datasets relating to the examination volume, each of the two-dimensional real image datasets including a two-dimensional x-ray projection of the examination volume in relation to a projection direction; and
- determining, via a processor, the first difference image dataset based on the two-dimensional real image datasets received and based on a first trained function, the first difference image dataset being at least four-dimensional; and
- wherein the four-dimensional first difference image dataset is determined by application of the first trained function to the two-dimensional real image datasets.

18. A non-transitory computer program product storing a computer program, directly loadable into a memory of at least one of a determination system and a training system, the computer program including program sections to carry out the method of claim 17 when the program sections are carried out by the at least one of the determination system and the training system.

19. A non-transitory computer-readable storage medium, storing program sections, readable and executable by at least one of a determination system and a training system, to carrying out the method of claim 17 when the program sections are carried out by the at least one of the determination system and the training system.

20. A method for adjusting a first trained function, comprising:
- receiving the first trained function via an interface;
- receiving, via the interface, first two-dimensional training image datasets of an examination volume and second two-dimensional training image datasets of the examination volume, each of the first two-dimensional training image datasets including a two-dimensional x-ray projection of the examination volume in relation to a projection direction wherein the examination volume does not include any x-ray contrast media during recording of a first two-dimensional x-ray projection, and each of the second two-dimensional training image datasets including a second two-dimensional x-ray projection of the examination volume in relation to a projection direction wherein the examination volume includes x-ray contrast media during the recording of a second x-ray projection for the second two-dimensional x-ray projection of the examination volume in relation to a projection direction;
- determining, via a processor, a first training difference image dataset by digital subtraction angiography based on the first two-dimensional training image dataset and the second two-dimensional training image datasets;
- determining, via the processor, a second training difference image dataset based on the second two-dimensional training image datasets and based on the first trained function; and
- adjusting the first trained function based on a comparison of the first training difference image dataset determined and the second training difference image dataset determined, via the processor.

21. A non-transitory computer program product storing a computer program, directly loadable into a memory of at least one of a determination system and a training system, the computer program including program sections for carrying out the method of claim 20 when the program sections are carried out by the at least one of determination system and the training system.

22. A non-transitory computer-readable storage medium, storing program sections, readable and executable by at least one of a determination system and a training system, to carrying out the method of claim 20 when the program sections are carried out by the at least one of the determination system and the training system.

23. A determination system for determination of a first difference image dataset of an examination volume, the determination system comprising:
- an interface, embodied to receive two-dimensional real image datasets relating to the examination volume, each of the two-dimensional real image datasets including a two-dimensional x-ray projection of the examination volume in relation to a projection direction; and
- a processor, embodied to
  - reconstruct a three-dimensional real image dataset based on the two-dimensional real image datasets received, and
  - determine the first difference image dataset based on the two-dimensional real image datasets received and based on a first trained function, the first difference image dataset being at least three-dimensional,
  - wherein determining of a three-dimensional first difference image dataset includes an application of the first trained function to the three-dimensional real image dataset, via the processor.

24. An x-ray unit comprising the determination system of claim 23.

25. The determination system of claim 23, wherein the first difference image dataset is at least three-dimensional.

26. A training system for adjusting a first trained function, comprising:
- an interface, embodied to receive the trained function and further embodied to receive first two-dimensional training image datasets and second two-dimensional training image datasets of an examination volume, each of the first two-dimensional training image datasets including a two-dimensional x-ray projection of the examination volume in relation to a projection direction wherein the examination volume does not include any x-ray contrast media during recording of a first two-dimensional x-ray projection, and each of the second two-dimensional training image datasets including a second two-dimensional x-ray projection of the examination volume in relation to a projection direction wherein the examination volume includes x-ray contrast media during recording of a second x-ray projection;

a processor, embodied
  to determine a first training difference image dataset by digital subtraction angiography based on the first and the second two-dimensional training image datasets,
  to determine a second training difference image dataset based on the second two-dimensional training image datasets and based on the first trained function, and
  to adjust the first trained function based on a comparison of the first training difference image dataset determined and the second training difference image dataset determined.

27. A determination system for determination of a first difference image dataset of an examination volume, the determination system comprising:

an interface, embodied to receive two-dimensional real image datasets relating to the examination volume, each of the two-dimensional real image datasets including a two-dimensional x-ray projection of the examination volume in relation to a projection direction; and a processor, embodied to
  determine two-dimensional difference image datasets by application of the first trained function to the two-dimensional real image datasets, and
  determine the first difference image dataset based on the two-dimensional real image datasets received and based on a first trained function, the first difference image dataset being at least three-dimensional,
  wherein a three-dimensional first difference image dataset is determined by a reconstruction based on the two-dimensional difference image datasets.

28. A determination system for determination of a first difference image dataset of an examination volume, the determination system comprising:

an interface, embodied to receive two-dimensional real image datasets relating to the examination volume, each of the two-dimensional real image datasets including a two-dimensional x-ray projection of the examination volume in relation to a projection direction; and a processor, embodied to
  determine the first difference image dataset based on the two-dimensional real image datasets received and based on a first trained function, the first difference image dataset being at least four-dimensional, and
  determine two-dimensional difference image datasets by application of the first trained function to the two-dimensional real image datasets, wherein the four-dimensional first difference image dataset is determined by application of the first trained function to the two-dimensional real image datasets.

* * * * *